United States Patent
Bernard et al.

(10) Patent No.: US 12,273,196 B1
(45) Date of Patent: Apr. 8, 2025

(54) REDUCED POWER MEDIA ACCESS CONTROL PROCESSOR DESIGN

(71) Applicant: Calix, Inc., San Jose, CA (US)

(72) Inventors: Christopher Thomas Bernard, Wayzata, MN (US); Scott Notch, San Jose, CA (US)

(73) Assignee: Calix, Inc., San Jose, CA (US)

( * ) Notice: Subject to any disclaimer, the term of this patent is extended or adjusted under 35 U.S.C. 154(b) by 0 days.

(21) Appl. No.: 18/400,706

(22) Filed: Dec. 29, 2023

Related U.S. Application Data

(63) Continuation-in-part of application No. 18/095,644, filed on Jan. 11, 2023, now Pat. No. 12,095,556.

(51) Int. Cl.
*H04L 1/18* (2023.01)
*H04L 1/00* (2006.01)

(52) U.S. Cl.
CPC .......... *H04L 1/0047* (2013.01); *H04L 1/0052* (2013.01)

(58) Field of Classification Search
None
See application file for complete search history.

(56) References Cited

U.S. PATENT DOCUMENTS

| | | | | |
|---|---|---|---|---|
| 6,400,290 B1 * | 6/2002 | Langhammer | .... | H03M 13/6583 341/94 |
| 11,601,216 B1 * | 3/2023 | Gunn | ................ | H03M 13/3746 |
| 11,791,840 B1 * | 10/2023 | Berman | ................ | G11C 16/26 714/764 |
| 12,095,556 B2 | 9/2024 | Bernard et al. | | |
| 2005/0270855 A1 * | 12/2005 | Earhart | ............... | G06F 11/1076 365/189.05 |

(Continued)

FOREIGN PATENT DOCUMENTS

| | | |
|---|---|---|
| KR | 20130018235 | 2/2013 |
| WO | 2024151848 | 7/2024 |

OTHER PUBLICATIONS

"U.S. Appl. No. 18/095,644, Notice of Allowance mailed Aug. 7, 2024", 10 pgs.

(Continued)

*Primary Examiner* — Mujtaba M Chaudry
(74) *Attorney, Agent, or Firm* — Schwegman Lundberg & Woessner, P.A.

(57) ABSTRACT

Systems and techniques for forward error correction decode processing power reduction are described herein. A capacity of a network slice is determined for a user network interface (UNI) based on a subset of forward error correction (FEC) codewords to be decoded by the media access control processor. A number of decoder cores is calculated to decode the capacity of the network slice. A utilization value is determined for a decoder core. A decoder utilization value is calculated for the decoder cores using the utilization value a number of decoding iterations. A non-decoding media access control processor utilization value is obtained for the network slice. A geometry is calculated for the media access control processor using the number of decoder cores, the decoder utilization value, and the non-decoding media access control processor utilization value. A media access control processor manufacturing specification data is generated based on the calculated geometry.

20 Claims, 13 Drawing Sheets

(56) References Cited

U.S. PATENT DOCUMENTS

| | | | |
|---|---|---|---|
| 2009/0217124 A1* | 8/2009 | Litsyn | H03M 13/1545 |
| | | | 714/752 |
| 2011/0004809 A1 | 1/2011 | Hirth | |
| 2013/0272706 A1 | 10/2013 | Effenberger et al. | |
| 2014/0129205 A1* | 5/2014 | Rolle | G06F 9/30156 |
| | | | 712/226 |
| 2014/0237323 A1 | 8/2014 | Yu et al. | |
| 2015/0281057 A1* | 10/2015 | Thubert | H04B 10/1149 |
| | | | 398/43 |
| 2018/0183564 A1 | 6/2018 | Caggioni et al. | |
| 2019/0305854 A1* | 10/2019 | Campos | H04J 14/02 |
| 2020/0311195 A1* | 10/2020 | Mishra | G06F 40/253 |
| 2024/0235731 A1 | 7/2024 | Bernard et al. | |

OTHER PUBLICATIONS

"International Application Serial No. PCT US2024 011233, International Search Report mailed May 2, 2024", 4 pgs.
"International Application Serial No. PCT US2024 011233, Written Opinion mailed May 2, 2024", 3 pgs.

* cited by examiner

|  | FPGA Resources | | Power (W) at Various Traffic Rates | | |
| --- | --- | --- | --- | --- | --- |
|  | Logic Cells | RAM | No Traffic | 10G | 50G |
| 50G LDPC FEC Decoder - no CDW Support | 200,000 | 11Mb | 4.5 | 4.5 | 4.5 |
| 50G LDPC FEC Decoder | 200,000 | 11Mb | 0.5 | 1.4 | 4.5 |
| 12.5G LDPC FEC Decoder | 50,000 | 3Mb | 0.5 | 1.4 | N/A |
| Savings | 75% | | 89% | 69% | |

*FIG. 6*

REDUCED POWER MEDIA ACCESS CONTROL PROCESSOR DESIGN

PRIORITY APPLICATION

This application is a continuation-in-part of U.S. patent application Ser. No. 18/095,644, filed Jan. 11, 2023, the content of which is incorporated herein by reference in its entirety.

TECHNICAL FIELD

Embodiments described herein generally relate to network processing power consumption reduction and, in some embodiments, more specifically to forward error correction power conservation.

BACKGROUND

Low density parity check forward error correction (LDPC-FEC) can be used to determine network data error rates. LDPC-FEC can encode data resulting in processing power (e.g., electric energy) usage to encode and decode data. In some instances, decoding can be responsible for more than half of the processing workload and power consumption of a networking device. Network standards bodies have sought to improve the energy impact of operating access networks. Worldwide energy crises have a renewed the call to implement reduced energy consumption in networking hardware executing as central office (CO) equipment and as customer premise equipment (CPE).

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 6 illustrates an example of power utilization chart illustrating power utilization at various traffic rates for a field-programmable gate array (FPGA) with and without forward error correction decode processing power reduction, according to an embodiment.

DETAILED DESCRIPTION

Figure 1:
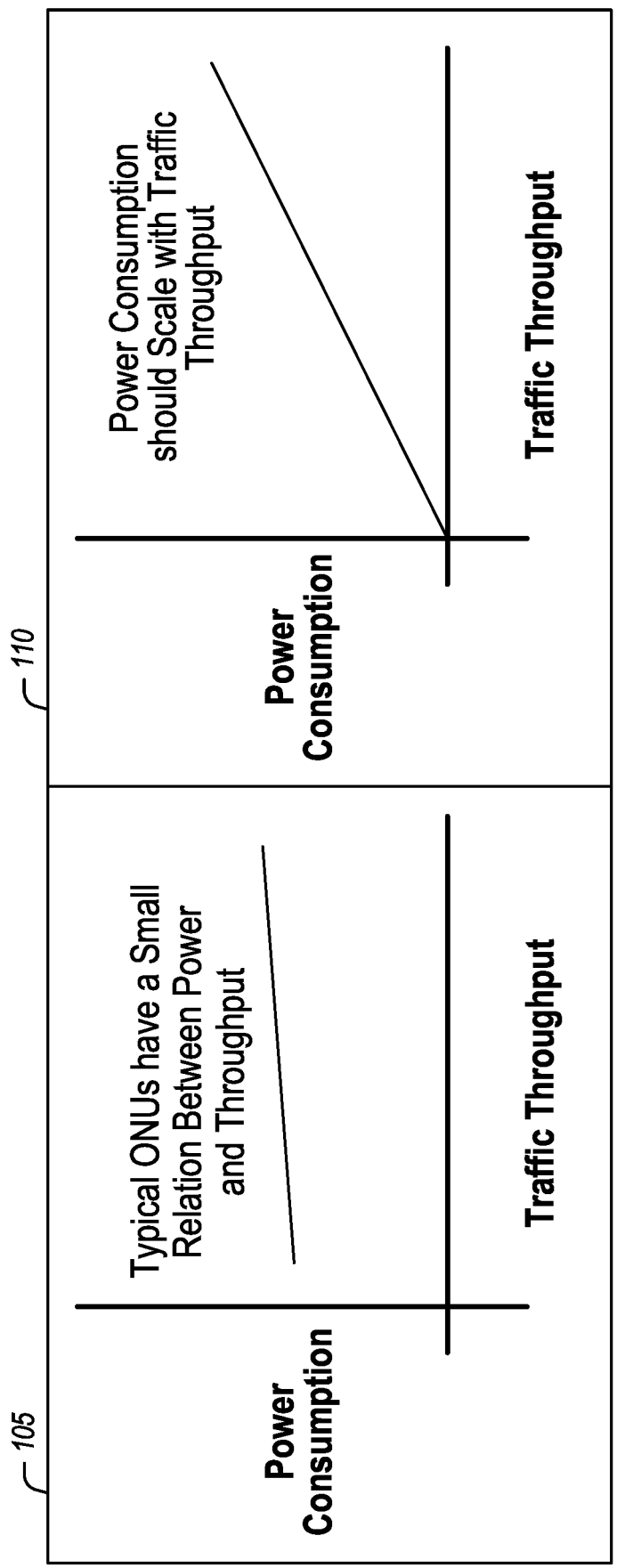
FIG. 1 illustrates an example of a relation between power consumption and throughput for typical optical network unit (ONU) and a relation between power consumption and throughput for an ideal ONU.

FIG. 1 illustrates an example of a relation between power consumption and throughput for typical optical network unit (ONU) 105 and a relation between power consumption and throughput for an ideal ONU 110. As shown in FIG. 1, for the typical ONU 105, there is little power savings achieved when traffic stops flowing. The ideal ONU 110 illustrates power going to a minimal amount when there is no traffic. The systems and techniques described herein measurably increase the power consumption to throughput slope of the typical ONU 105 to approach the ideal ONU 110.

The systems and techniques described herein make modification to a passive optical network transmission convergence (PON-TC) layer to achieve better power/traffic correlation. International Telecommunication Union (ITU) and Institute of Electrical and Electronics Engineers (IEEE) PON-TC layers beyond physical layer (PHY) rates of 10 gigabits (Gbs) use more advanced forward error correction (FEC) coding gain to meet industry accepted optical distribution network (ODN) link budgets. In the ITU (G.9804.2) High-Speed PON standard, low density parity check (LDPC) codes have been adopted to replace Reed-Solomon codes used in gigabit-capable passive optical network (GPON) and symmetric 10-gigabit passive optical network (XGS-PON). LDPC FEC provides improved coding gain to offset the higher error-rate caused by pushing lasers/receivers to their theoretical limits.

An ONU implementing a 50 Gbs LDPC FEC decoder utilizes a tremendous amount of processing power. According to application specific integrated circuit (ASIC) vendors, it is estimated that 60-70% of the PON TC layer power is due to the FEC decoder function-on the order of 750 mW in a 5 nm process technology. Soft-decision FEC can be used to meet some link budgets which can increase computational power by a factor of two since the FEC decoder acts upon not only the recovered data, but also on a probability vector describing the likelihood that a given bit was sample wrong.

Point-to-multipoint network optical network terminals (ONTs) receive and decode all downstream traffic and filter out a small subset that is destined for the subscriber subtended from the ONT. Consider the entirety of the ODN—128 ONTs all decoding 50 Gbs of LDPC FEC—resulting in a set of ASICs collectively decoding (128*50 Gbs=6.4 terabits (Tbs)) of traffic-even though at most 50 Gbs is actually processed as user traffic. From a power dissipation perspective power consumption is (750 mW*128=96 W) due to the FEC decoding across the ODN.

The systems and techniques described herein provide a standards based technique that allows an ONU to only decode FEC codewords that contain traffic destined for that ONU, such that other codewords can be paused translating into substantial power savings across an ODN. This results in an estimated 98% power savings across an ODN-which scales to 73 W per 100 ONTs. This scales to a substantial amount considering a future 50 G-PON lifetime scale of 100 M endpoints resulting in up to 73 MW of power savings.

Figure 2:
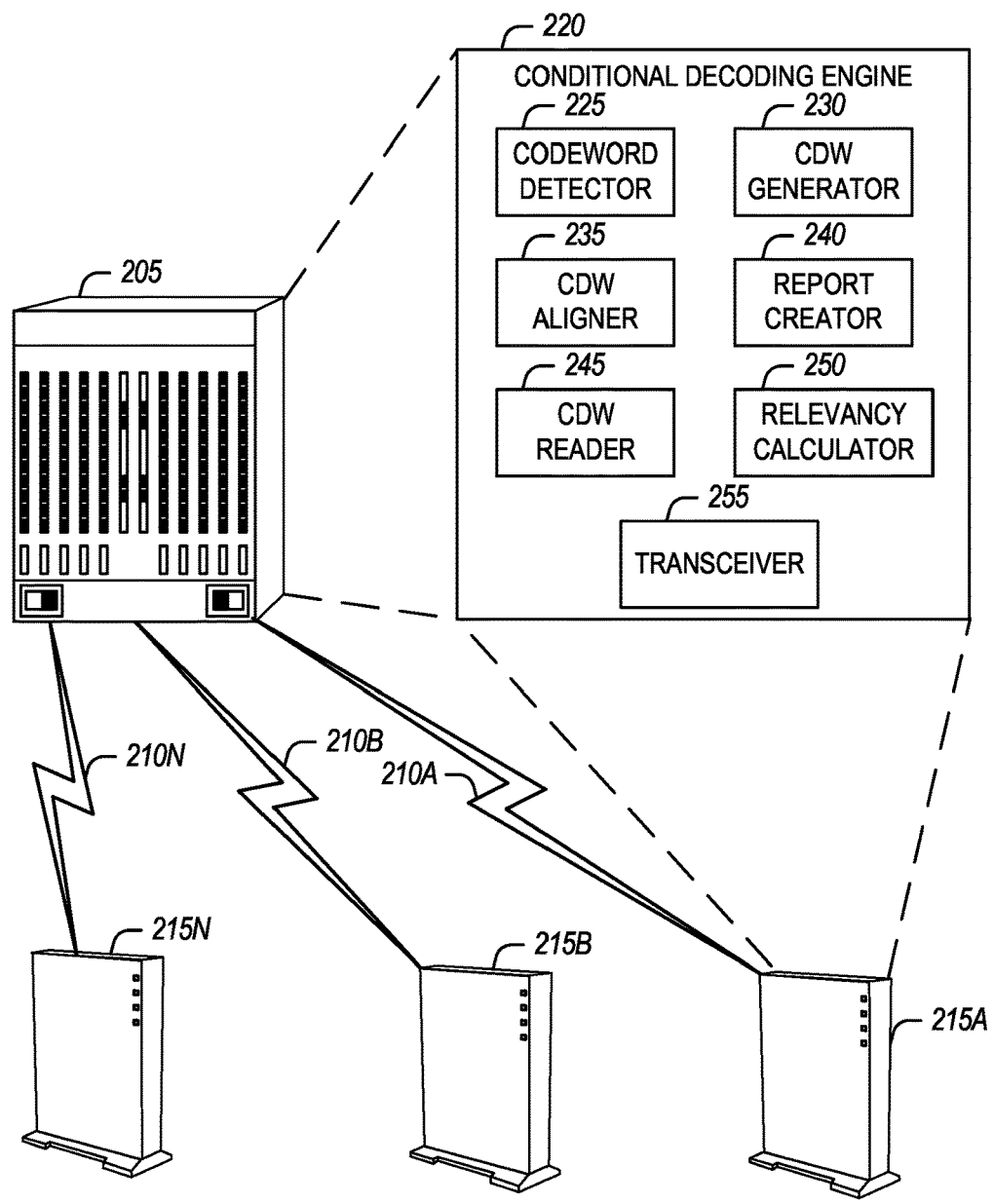
FIG. 2 is a block diagram of an example of an environment and a system for forward error correction decode processing power reduction, according to an embodiment.

FIG. 2 is a block diagram of an example of an environment 200 and a system 220 for forward error correction decode processing power reduction, according to an embodiment. The example environment 200 includes an optical line terminal (OLT) 205 that is connected via optical links 210A, 210B, and 210N to optical network units (ONUs) 215A, 215B, and 215N. The OLT 205 and the ONUs 215A, 215B, and 215N can include the system 220. In an example, the system 220 is a conditional decoding engine. The example system 220 includes a codeword detector 225, a conditional decoding window (CDW) generator 230, a CDW aligner 235, a report creator 240, a CDW reader 245, a relevancy calculator 250, and a transceiver 255.

ITU based PON transports encapsulate user traffic within a construct called 10-gigabit-capable PON encapsulation method (XGEM). XGEM encapsulation allows traffic to be fragmented and separated by service. XGEM headers contain the size of the frame such that a receiver can delineate the incoming traffic and filter only those fragments that are intended for this receiver. XGEM fragments are of variable size such that the receiver tracks and verify the position of the next header on an on-going basis-a technique referred to here as XGEM delineation.

Figure 3:
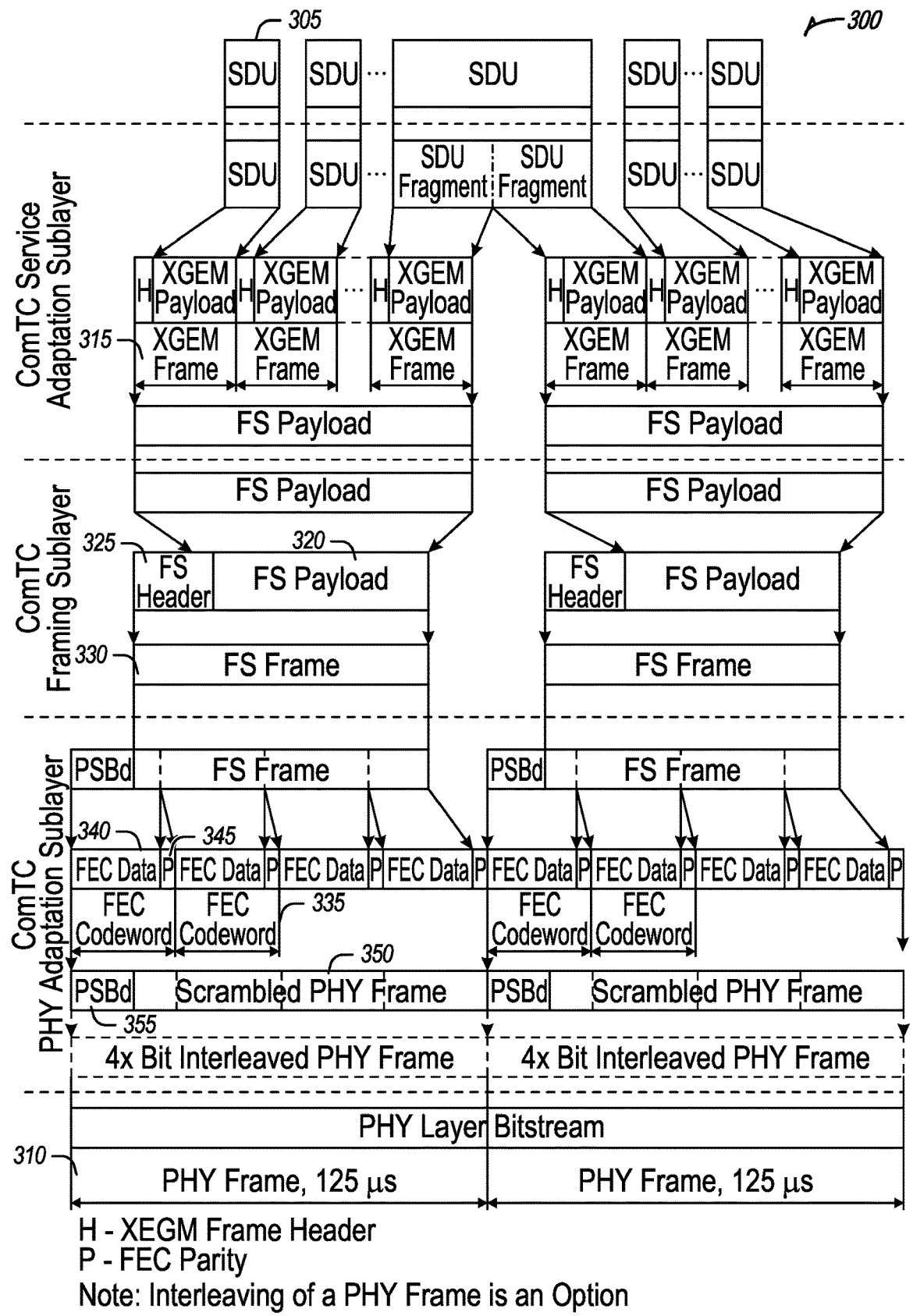
FIG. 3 illustrates a flow diagram of an example of downstream service data unit (SDU) mapping into physical layer (PHY) frames.

FIG. 3 illustrates a flow diagram 300 of an example of downstream service data unit (SDU) 305 mapping into physical layer (PHY) frames 310. A PON TC layer begins with a service adaption of service data units (SDUs) 305 (e.g., user data) into a series of XGEM encapsulated fragments 315. These are mapped to a framing sublayer (FS) payload 320, which along with an FS header 325 represent an FS Frame 330 that carries traffic to an ONU. The FS frame is broken into a series of FEC codewords 335 comprised of a data portion 340 and a parity portion 345 calculated by the FEC encoder. The FEC decoder uses the parity 345 to correct any bits that were transmitted with errors in the codeword 335, up to ~1E-2 bit-error-rate. The FEC codewords 335 are then scrambled/interleaved 350 and sent every 125 μs along with a physical synchronization block (PSBd) 355 that an ONU recovers to maintain downstream synchronization.

Returning to the description of FIG. 2, when an ONU (e.g., ONUs 215A, 215B, 215N, etc.) receives data at a higher error-rate than the FEC decoder can correct, loss of XGEM delineation occurs. If an ONU decides to not decode some of the codewords, it is expected that this would also lead to a loss of XGEM delineation. The XGEM state machine sees some number of valid XGEM headers in a row before it declares XGEM-lock-such that data loss can be expected for a few packets even when the proper error-rate has been restored.

In order for an ONU to selectively ignore certain codewords, two factors are considered: (1)the concept of a conditional decoding window with guaranteed XGEM delineation at the beginning and (2) a method to convey to the ONU which XGEM headers apply to a conditional decoding window.

The examples used herein refer to use in 50 G-PON (ITU standard G.9804.3) however, the system 220 can operate similarly in a variety of networks that use forward error correction such as, by way of example and not limitation, other PON systems, wireless networks, Ethernet networks, and other networks that use LDPC-FEC or other form of forward error correction. For example, a system utilizing a block-FEC (rather than packet based) is suitable for applicability, including 25 GS-PON, 802.3ca 25 G EPON, 10-gigabit-capable PON (XG-PON), 10-gigabit-capable symmetric PON (XGS-PON), and future very-high-speed-PON (G.VHSP).

A new construct in the PON-TC layer is generated by the CDW generator 230 called a conditional decoding window (CDW) comprised of a configurable number of FEC codewords detected by the codeword detector 225. The CDW represents a portion of the PON-TC that an ONU can choose to ignore. A CDW can encompass an entire PON-TC frame (125 μs), or could be broken up into many CDWs per frame. In an example, a configurable parameter for the CDW configuration is set by the OLT and honored by a compliant ONT.

Characteristics of a CDW

A new CDW is aligned with the beginning of a new FEC codeword. The OLT 205 aligns XGEM delineation to the beginning of a new CDW such that the ONUs 215A, 215B, and 215N have immediate XGEM delineation if the previous CDW was not being processed. The end of a CDW contains either a full fragment up to the end, or an IDLE frame aligned to the end. A new CDW aligns with the beginning of a PON-TC frame and contain a pointer to the beginning of the first conditional section. The last CDW in a PON frame can have fewer codewords. An ONU that is not compliant observes legal XGEM framing and maintains XGEM delineation throughout the PON-TC frame. The ONUs 215A, 215B, and 215N decode the first codeword of the PON-TC frame to determine whether additional codewords are to be decoded before the FS payload begins.

The codeword detector 225 identifies a first codeword in a network transmission. In an example, the network transmission is a passive optical network transmission convergence (PON-TC). The CDW generator 230 generates a conditional decoding window that begins with the first codeword. In an example, a codeword count can be determined for the conditional decoding window. Additional codewords can be added to the conditional decoding window until the codeword count is reached. The additional codewords sequentially following the first codeword in the network transmission. In an example, it can be determined that the additional codewords are insufficient to reach the codeword count and an idle frame can be added to the conditional decoding window to reach the codeword count.

The CDW aligner 235 aligns the conditional decoding window with a frame of the network transmission. In an example, the CDW aligner 235 can delineate the frame to generate a delineation point and the conditional decoding window is aligned with the delineation point.

CDW Report Format

A CDW aware ONU (e.g., ONUs 215A, 215B, and 215N) can determine whether to ignore certain CDWs based upon whether the traffic within applies to itself. In order to make this decision, the OLT 205 sends a report that conveys the content of the current CDW, herein referred to as a 'CDW Report'. For example, a CDW-report-downstream (CDWRd) can be transmitted to an ONU. The content of the report can be sent a number of different ways allowing the ONU to determine whether to process the CDW or safely ignore and resume on the next CDW.

A low-precision CDW report format can be the simplest report format and easiest to implement. The report can be sent as a single binary bit to each ONU specifying whether the current CDW is relevant to each ONU 215A, 215B, and 215N. The report can be encapsulated at the beginning of the CDW and can contain one-bit-per ONU—128b total in addition to the XGEM header. The ONU makes decoding decisions per CDW. The ONU would have no visibility into which of the CDW codewords carries the data-only that it is located somewhere and the codewords should be decoded. The OLT is responsible for assembling an XGEM to ONU map for the entire CDW and encapsulating the map into a reserved XGEM frame.

This is considered a 'low precision' report as it only specifies an ONT to decode or ignore an entire CDW. If the window is large it is likely that the ONU is decoding codewords that have no relevant traffic. This method is appropriate for the 'low power, no traffic' modes, but during times of high traffic across many services, the entirety of the PON can be decoding much more than necessary. Low-precision formatting offers a tradeoff between complexity and efficiency.

A high-precision CDW report format can send each compliant ONU a list of codewords within the CDW that apply. Each code word within the CDW can have a binary decode/ignore flag per ONU. High-precision formatting is the most efficient in that the ONU knows exactly which codewords to process and which to ignore within a CDW, but comes at the cost of higher complexity and overhead.

A variable-precision CDW report format can send high-precision report content to only those ONTs which can substantially benefit and offers a balance between efficiency and overhead. The low precision report is sent followed by some number of high-precision reports at the discretion of the OLT 205 with the intent of minimizing report size while maximizing codeword efficiency. ONUs that have minimal codewords to process in a CDW would be sent a high-precision report while ONUs that have many code words to process would rely on the low-precision report. Variable size report formatting can send reports only to ONUs with active traffic flows.

Multiple examples are provided for how a codeword report could be formatted; low precision, high precision, or variable precision (as a combination of the two previous forms). In an example, a codeword report can be a report that utilizes lossless compression to reduce overhead of the report regardless of the precision of the report. Minimizing the report size reduces bandwidth utilization. The use of lossless compression provides reduced report size leading to reduced bandwidth utilization. It should be understood that a variety of techniques can be used to reduce the size of the reports while maintaining integrity of the report data to reduce bandwidth utilization.

Variable formatting can be complex to create and can be non-deterministic in its overhead—the more traffic flows, the more overhead.

An XGEM-list CDW report format can send a discrete list of XGEM-IDs contained within the CDW. The advantage of the XGEM-list format is that the OLT 205 sends a list and lets each ONU decide whether the information within is relevant for its conditional decoding decision.

The report creator 240 generates a report that includes an indication of relevance of the conditional decoding window to a network device (e.g., the ONUs 215A, 215B, and 215N). In an example, the report creator 240 can create a binary indicator of the relevance of the conditional decoding window to the network device for inclusion in the report. In an example, the report creator 240 can generate a list of codewords included in the conditional decoding window and assign a binary indicator of the relevance of each codeword in the list of codewords to the network device for inclusion in the report. In an example, the report generator 240 can determine that network device is experiencing increased traffic volume and can include the list of codewords and the binary indicator of the relevance of each codeword in the report before transmission to the network device.

Example bandwidth utilization for the CDWRd using various CDW formats can include: Low Precision, CDW-Size=16 Overhead=35 Mbs (Gets smaller with larger CDW-Size); High Precision, CDW-Size=16 Overhead=412 Mbs (Every ONT gets a report for every code word. Independent of CDW-Size); Variable Precision, CDW-Size=16 Overhead=200 Mbs? (Dependent on a number of active streams). As discussed above, the reports can be containerized at various levels and compression can be used to reduce the size of the CDWs and reports.

CDWRd Conveyance Mechanisms

The CDW Report is sent using a standards-based construct including, by way of example and not limitation, XGEM based conveyance, physical layer operation administration and maintenance (PLOAM) based conveyance, internet protocol (IP) based conveyance, and PON-TC protocol conveyance XGEM Based Conveyance: One option for sending the CDW report is to reserve an XGEM-ID dedicated to this function. XGEM is suitable for a high-bandwidth real-time protocol such as the proposed CDW-Reports. At the beginning of a CDW, the first XGEM can contain the CDW report. Compliant ONUs 215A, 215B, and 215N subscribed to this XGEM use this information to assemble a map of codewords within the CDW that can be safely ignored resulting in a temporary power savings. Non-compliant ONUs ignore the contents because they are not subscribed to this XGEM service and would process all codewords as normal.

PLOAM based Conveyance: PLOAM messages are used to send information between the OLT 205 and ONUs 215A, 215B, and 215N. It is possible to construct a new PLOAM message that can carry a CDW report. PLOAM messages occur at the beginning of a PON frame meaning the CDW can only be one-frame that can be too large due to added latency. Additionally, PLOAM messages are typically handled by a software process and are not suitable for high-bandwidth real-time information.

IP based Conveyance: The CDW is a PON-TC layer construct and can use a conveyance method at this level for ITU based PONs. Ethernet PONs rely on link-layer Ethernet protocols for real-time messaging. The CDW report can be transmitted by sending the CDW report in a link-layer Ethernet frame.

PON-TC Protocol Conveyance: A new TC layer field can be constructed to include a downstream report to the ONU indicating which codewords are relevant and which can be ignored. This can utilize existing constructs such that the technique can be implemented without changing in-force standards. Future PON standard yet to be written can include such constructs native to the TC layer that can be modified to accommodate CDW report transmission.

The transceiver 250 transmits the conditional decoding window and the report to the network device. In an example, the transceiver 250 can obtain a ten-gigabit capable encapsulation identifier (XGEM-ID) and the report can be transmitted using the XGEM-ID. In an example, the transceiver 250 can generate a physical layer operation administration and maintenance (PLOAM) message and the report can be transmitted within the PLOAM message. In an example, the transceiver 250 can generate a link-layer Ethernet frame and the report can be transmitted within the link-layer Ethernet frame. In an example, the transceiver 250 can generate a transmission convergence (TC) field and the report can transmitted within the TC field.

CDW Size

ITU standard G.9804.3 defines a FEC code word using an LDPC (17280,14592). Each code word is 2160 octets in length of which 336 octets are parity. There are 360 codewords that comprise a frame in a G.9804.3 compliant TC. In order to convey the CDW map to the ONT it looks ahead at the XGEM-IDs in flight and send sufficiently prior such that the ONT can make its conditional decoding decision. A look ahead is another way of describing a buffer. In order to control the added latency of this conveyance buffer, the OLT can decide to utilize a small CDW (e.g., 8 codewords). With smaller CDWs come potentially larger overheads due to XGEM delineation as well as the conveyance content. In an example, the size can be configurable from 1 codeword up to a full 360 codeword frame. In an example, the CDW generator 230 can determine a codeword count for the conditional decoding window and the transceiver 255 can transmit the codeword count to the network device.

Considerations for the Beginning of a PON-TC Frame

Normally an ONU only decodes the first codeword of a CDW to receive the report and determine decoding needs for the window. In the case of the first CDW of a PON-TC frame there are other factors to consider. The beginning of the PON frame contains critical information such as PLOAM messages, upstream bandwidth maps, and other framing information. ONUs process the FS header that can span greater than a single codeword. Early in the frame is a description of the size of the PLOAM/upstream bandwidth map (BW-map) partition such that a compliant ONU can determine how many of the initial codewords to process. This unique case applies to the first CDW in a PON-TC frame.

Reporting an ONU's CDW Feature Capability

A new ONT management control interface (OMCI) management information block (MIB) element is added that allows an ONT to declare its capability with regard to the CDW. Ethernet PON standards use alternate link-layer messaging protocols to declare capability.

CDW-reports can be sent to ONUs without learning their capability because the protocol is backwards compatible with the standards. This trades efficiency to simplify the OLT without any changes to management/provisioning. A compliant OLT sends the reports in their entirety and rely on an ONUs compliance to support CDW compatibility or ignore CDW reports in the case of a non-compliant ONU.

Backwards Compatibility and Interoperability

If both an OLT and an ONU are compliant, the compliant OLT learns of the ONUs capability through MIB upload and send the CDW size over OMCI, as well as a real-time CDW report for the purposes of conditional FEC decoding.

If the OLT is compliant and the ONU is non-compliant, ONUs that do not report a CDW capability processes FEC codewords as normal and maintain XGEM delineation as normal. The compliant OLT terminates XGEM frames, sends an XGEM CDW report, and resumes XGEM frames on CDW/FEC codeword boundaries. A non-compliant ONU observes these as normal XGEM frames and ignores the CDW report port-ID. Non-compliant ONUs can safely exist with compliant ONUs because there is no change to the G.9804.3 specification compliance of the TC-layer.

If the OLT is non-compliant and the ONU is compliant, the non-compliant OLT ignores the ONUs capability and processes TC frames as normal. ONUs do not receive a CDW report and therefore does not disable decoding.

If both the OLT and the ONU are non-compliant, they operate using standard TC operation per G.9804.3.

While the examples refer to downstream ONUs, the OLT has a FEC decoder. Because there is only one per PON, any savings offered by allowing the OLT to ignore codewords would be minimal. There is no need to conditionally process because the mere presence of an ONU burst implies that it is traffic bearing.

The transceiver 255 receives a conditional decoding window including a first codeword that is identified by the CDW reader 245. The relevancy calculator 250 obtains a report that includes a codeword relevance bit for the first codeword. Upon determination by the relevancy calculator 250 that the codeword relevance bit indicates that the first codeword is irrelevant, the first codeword is discarded without decoding the first codeword. If the relevancy calculator 250 determines that the codeword is relevant, the codeword is decoded.

In an example, the relevancy calculator 250 can receive a codeword count for the conditional decoding window. The relevancy calculator 250 can determine that a set of codewords including the first codeword contained in the conditional decoding window are irrelevant based on the codeword count and the codeword relevance bit and can discard the conditional decoding window without decoding the set of codewords.

In an example, the relevancy calculator 250 can subscribe to a ten-gigabit capable encapsulation identifier (XGEM-ID) published on a network. The relevancy calculator 250 can receive the report based on the XGEM-ID. The relevancy calculator 250 can generate a map of a set of codewords in the conditional decoding window, determine that a first subset of the set of codewords is relevant using the report, determine that a second subset of the set of codewords is irrelevant using the report. The relevancy calculator 250 can decode the first subset of the set of codewords and discard the second subset of the set of codewords without decoding.

In an example, the relevancy calculator 250 can receive a physical layer operation administration and maintenance (PLOAM) message and can obtain the report from the PLOAM message. In an example, the relevancy calculator 250 can receive a link-layer Ethernet frame and can obtain the report from the link-layer Ethernet frame. In an example, the relevancy calculator 250 can identify a transmission convergence (TC) field in a network transmission and can obtain the report from the TC field.

Figure 4:
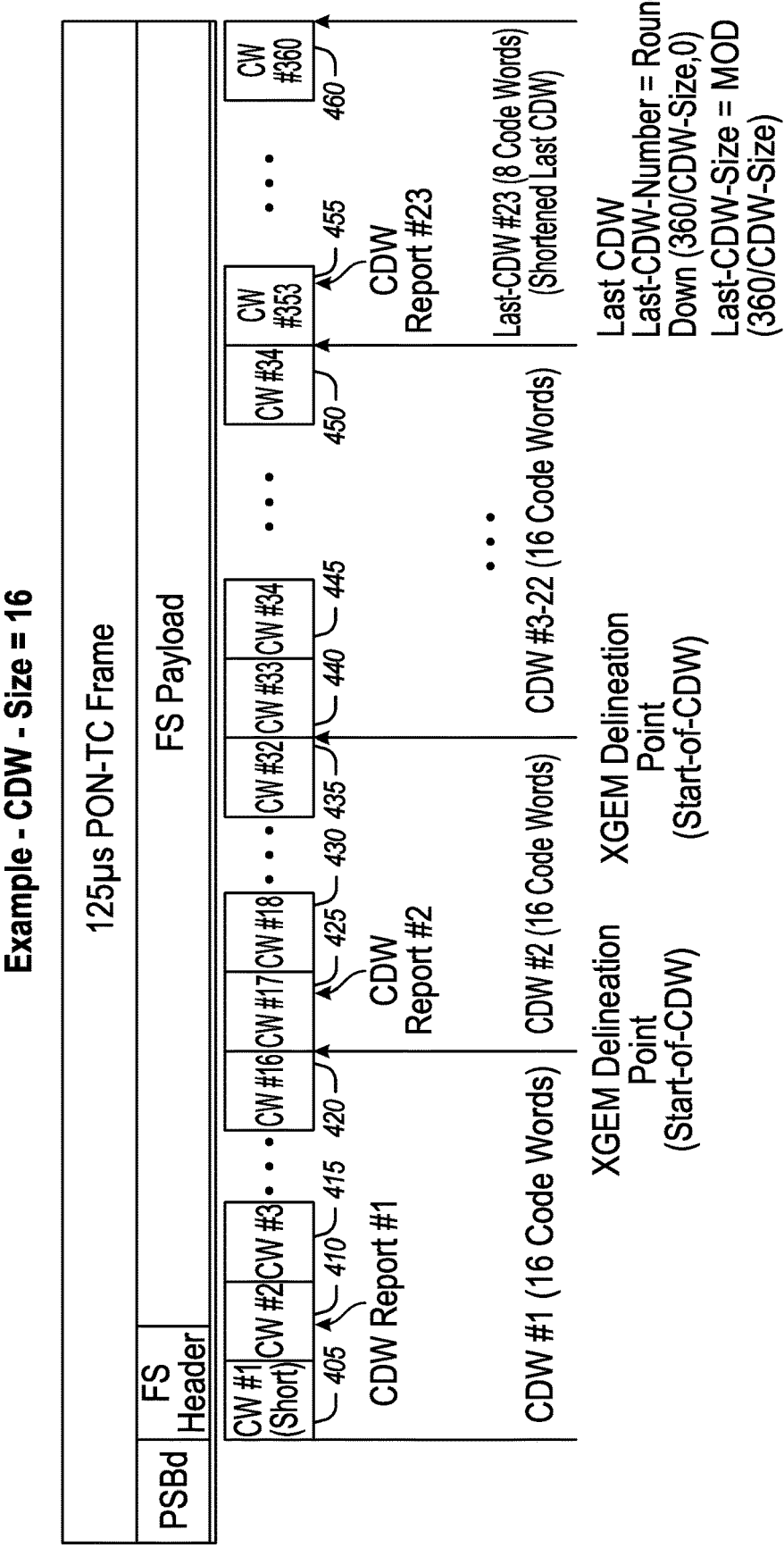
FIG. 4 illustrates an example of a sixteen codeword sized conditional decoding window for forward error correction decode processing power reduction, according to an embodiment.

FIG. 4 illustrates an example of a sixteen codeword sized conditional decoding window 400 for forward error correction decode processing power reduction, according to an embodiment. The sixteen codeword sized conditional decoding window 400 results in 22 full windows and one shortened window at the end to align with the PON frame. Codewords 405, 410, 425, 440, and 455 are codewords that ONUs process to receive a CDW report, codewords 415, 420, 430, 435, 445, and 460 are conditional codewords. In this example, an ONU (e.g., ONUs 215A, 215B, or 215N as described in FIG. 2, etc.) with minimal traffic would only decode 24 of 360 codewords—a 93% savings of computational power. A CDW size of 16 encompasses 34,560 octets, which equals about 5.5 microseconds of latency at a 50 G PHY rate. Anything less than 10 microseconds isn't expected to impact the highest of service grades. The larger the CDW-Size, the more savings an ONU can achieve at the expense of latency. It should be understood that the CDW can configured in a variety of sizes to balance power reduction and latency.

Reduced Rate LDPC-FEC Decoder

The ONU LDPC-FEC decoder itself has the capability of supporting the full PON PHY rate with conditionality on a per-codeword basis to reduce power. The systems and techniques described herein enable the use of a reduced rate FEC decoder in an ONU.

Consider an ONU with a 10 G user network interface (UNI) and a 10 G FEC decoder. Normally the FEC decoder would be overwhelmed by the task of decoding 50 G of incoming codewords. With the CDW enabled, an ONU could process codewords through a rate-matching buffer and still maintain traffic flow to the UNI without disruption. The benefit is that a 10 G decoder can use less logic/ASIC gates than a 50 G decoder resulting in a potential cost savings by using a reduced rate decoder in ONUs operating on compliant networks. An OLT that supports CDW for the 10 G ONU functions properly using this technique and may not be compatible with non-compliant OLTs.

Bit Error Rate Monitoring Considerations

ONUs report calculate receive bit-error-rate (BER) based upon the presence of correctable/non-correctable codewords. The pre-FEC bit error rate is essentially equal to the correctable-bits/received-bits over some sufficient time as to allow a BER 1E-12 measurement. The post-FEC bit-error-rate equals uncorrectable-bits/received-bits over some sufficient time to allow a BER 1E-12 measurement.

When the ONU is selectively ignoring codewords, the ignored codewords are left out of any bit-error-rate measurements provided to the OLT. The OLT does not assume the denominator based upon a time-span because the ONU can be ignoring codewords. Rather, BER information is instead retrieved directly from the each ONU.

Figure 5:
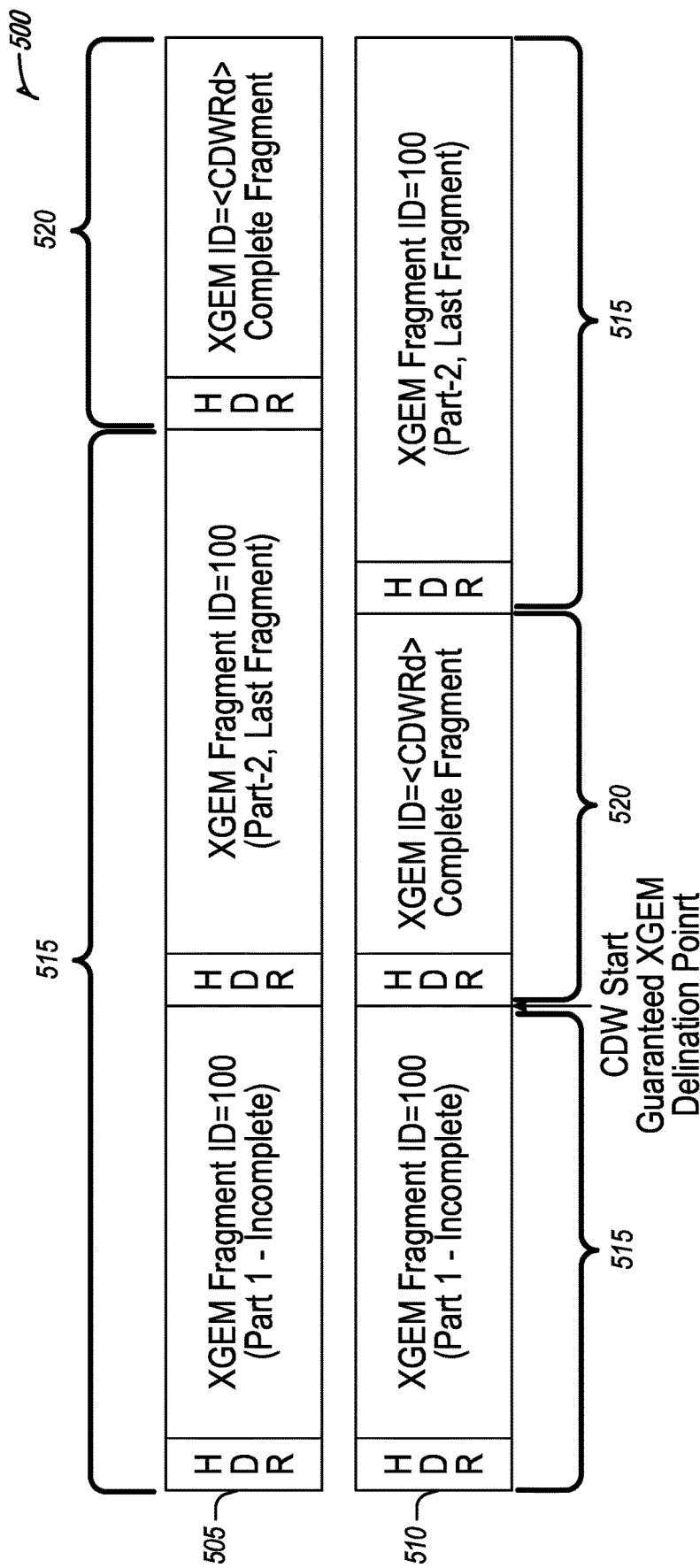
FIG. 5 illustrates a first example and a second example for the beginning of the CDW for forward error correction decode processing power reduction, according to an embodiment.

FIG. 5 illustrates a first example 505 and a second example 510 for the beginning of the CDW for forward error correction decode processing power reduction, according to an embodiment. ONUs support XGEM fragmentation which generally occurs at a frame boundary. A new XGEM packet is used which can force a fragment to occur outside the end-of-frame. The CDW-Report XGEM frame has two purposes. First, it provides a guaranteed delineation point at the beginning of a CDW that an ONU can use if it has been ignoring codewords within the previous CDW. Second, the CDW-Report sends the relevant information to the ONU about the current CDW for possible reduced decoding.

A forced delineation point causes an XGEM fragment. If the CDW-Report occurs in between the two fragments in process, an ONU adjusts for the offset. In an example, the second portion of the user fragment in process can be sent followed by the CDW-Report. This maintains no more than one fragment flow outstanding downstream at any given time.

The first example 505 illustrates completion of the XGEM frame that was fragmented 515 at the beginning of the CDW sent first with the CDW-report 520 being sent after the XGEM frame that was fragmented 515. The second example 510 has the CDW-report 520 sent prior to the completion of the XGEM frame that was fragmented 515. The first example 505 can be simpler for the ONT to process.

FIG. 6 illustrates an example of power utilization chart 600 illustrating power utilization at various traffic rates 305 for a field-programmable gate array (FPGA) with and without forward error correction decode processing power reduction, according to an embodiment. A 50 G LDPC FEC decoder without CDW support 610 shows consistent power consumption at the various traffic rates. A 50 G LDPC FEC decoder with CDW support 615 shows reduced power consumption at low traffic levels with power consumption increasing as traffic rates increase up to the consistent power consumption rate of the 50 G LDPC FEC decoder without CDW support 610 at full traffic rates.

In addition to the ability of a conditional decoding window to save power, it also allows the ability to save logic. For example, an ONU can implement just enough computational power to decode at a rate matching that of the UNI (User Network Interface). A 10 G UNI would only require 10 G of decoding capacity, significantly reducing the amount of programmable logic resources required to implement the functionality—saving both power AND cost. This is especially important in FPGAs which require far more silicon area per-logic-gate than an ASIC.

A reduced-rate FEC decoder 620 solves an issue with implementing a PON media access controller (PON-MAC) within an FPGA. The LDPC-FEC decoder consumes considerable logic and power to implement within a programmable FPGA fabric. Estimates of savings within an example FPGA are shown in FIG. 6. Power numbers were estimated using an FPGA power estimation tool.

The power savings shown in FIG. 6 reduce power utilization for implementing a 10 G UNI/ONU built on an FPGA system-on-chip (FPGA-SOC). The power savings mean an FPGA can be a suitable option for an ONU chip and a 50 G ONU can be implemented within an FPGA.

OTNs utilize FEC to overcome errors introduced in the application of sending information over long-haul optical links. The systems and techniques described herein are applicable to future OTN applications where the receivers can reduce power consumption when the traffic is less than full-rate.

The systems and techniques described here can be applied to an Ethernet point-to-point circuit to expands power consumption reduction beyond an optical access networks and a telecommunications applications. FEC is being utilized in Ethernet point-to-point links as transmission speeds become higher. For example, 400 G, 800 G, terabit class Ethernet, etc. uses FEC to overcome bit-error-rates associated with optics and electronics running at high transmission rates.

The systems and techniques described herein address the burst nature of an Ethernet link to minimize decoding of irrelevant codewords/data for use in data center applications that can experience times of intense traffic processing and times of low traffic processing. Data centers could realize power savings during off-peak times by reducing decoding processing for traffic not destined for the subject device.

The systems and techniques described herein are applicable to future point-to-point Ethernet standards for applications in data center server connectivity, graphics cards, crypto mining systems, etc. The systems and techniques described herein are applicable to high-bandwidth interconnects to achieve dynamic power savings.

Figure 7:
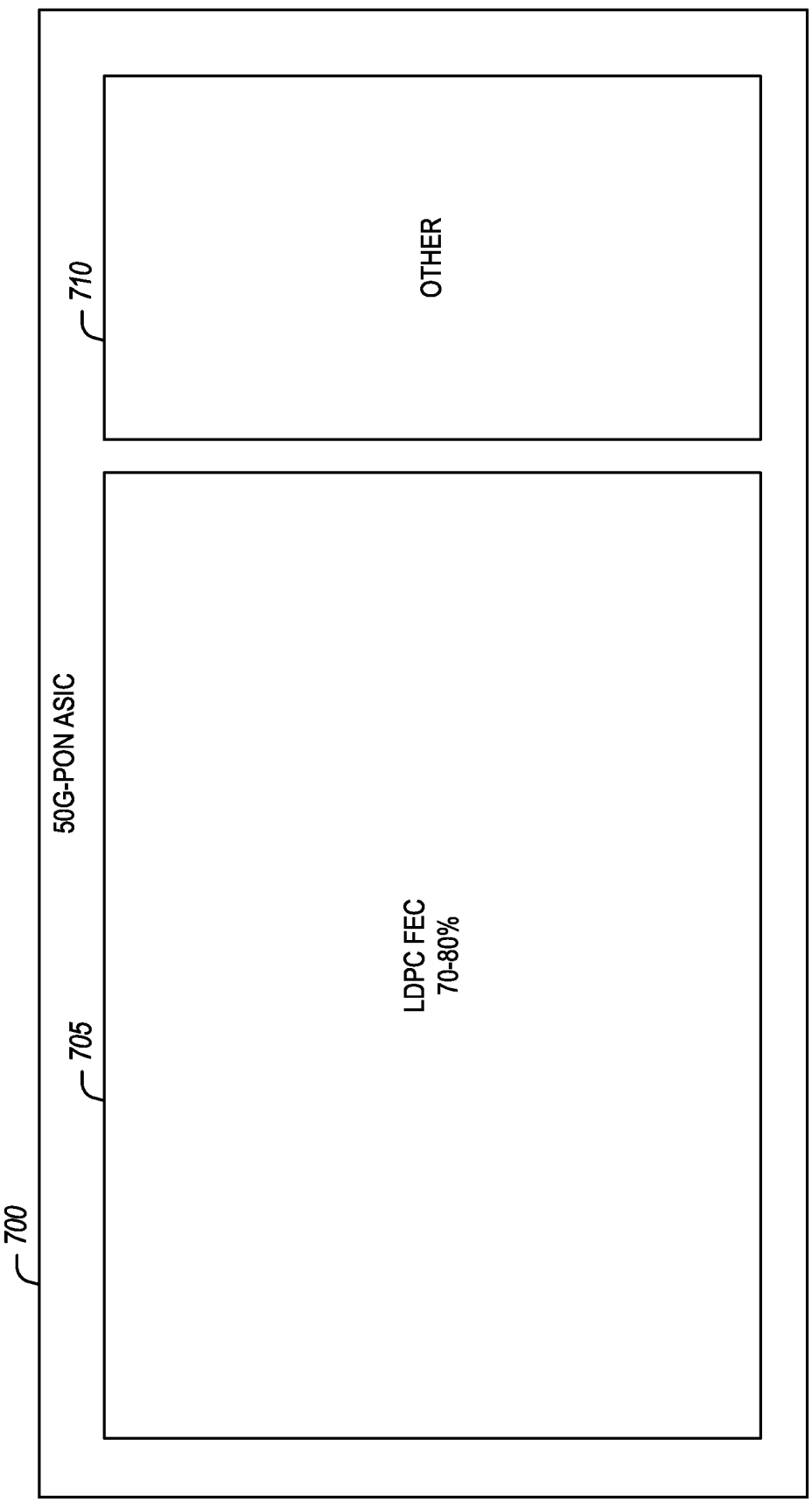
FIG. 7 illustrates an example of a media access control processor for forward error correction in a fifty-gigabit passive optical network, according to an embodiment.

FIG. 7 illustrates an example of a media access control processor 700 for forward error correction in a fifty-gigabit passive optical network, according to an embodiment. Fifty gigabit media access control (MAC) processors (e.g., field programmable gate arrays (FPGAs), application specific integrated circuits (ASICs), etc.) are dominated by processing workloads of the LDPC-FEC Decoder 705. The example media access control processor 700 may have a utilization as shown in TBL. 1.

TBL. 1

| Lookup Tables (LUTs) | WORKLOAD |
| --- | --- |
| 324000 | Downstream LDPC FEC Decoder (50 G, Three Iterations) |
| 30000 | Downstream TC Layer Framing |
| 26000 | Upstream Framing (w/ FEC Encoder) |
| 50000 | Packet Processing |
| 16000 | Misc |
| 446000 | Total Utilization |

324000 (Downstream LDPC FEC Decoding)/
446000 (Total Utilization) = 73% (LDPC-FEC Decoder 705)

In the example utilization, 73% of the capacity of the media access control processor 700 is utilized by the LDPC-FEC decoder 705 in processing forward error correction workloads. This leaves 27% of the media access control processor capacity available for other processing functions 710. Sizing the LDPC-FEC decoder 705 core includes considerations such as 1) a Total Decoding Rate and 2) a Number of LDPC iterations (e.g., required coding gain). The more coding gain required (e.g., to reach an acceptable BER, etc.), the more iterations are required which slows down the throughput of a single decoder core. In order to meet an arbitrarily high rate, decoder cores operate in parallel, each consuming a fixed amount of logic. The more coding gain required, the more iterations through the LDPC matrix are required, leading to more parallelization of the decoder engine.

An example of the impact of iteration on utilization is shown in TBL. 2.

TBL. 2

Sample Utilization Based on Iterations

1 Decoder Core = 27,000 LUTs
3 Iterations -> 4.1 Gbs per Decoder Core
50 G capacity = 12 Decoder Cores Total
Size = 27,000 * 12 = 324,000 LUTs (72% utilization)

As shown in TBL. 2, a single decoder core has a utilization of 27,000 LUTs. In this example, 3 iterations are necessary and each decoder core is capable of decoding 4.1 Gbs. This means 12 cores will run in parallel to decode the full 50 Gbs capacity. In this example, the total utilization of 12 cores with 27,000 LUTs individual utilization equals 324,000 total LUTs dedicated to decoding. As shown in TBL. 1, this amounts to 72% of the total LUTs available in the media access control processor 700.

Figure 8:
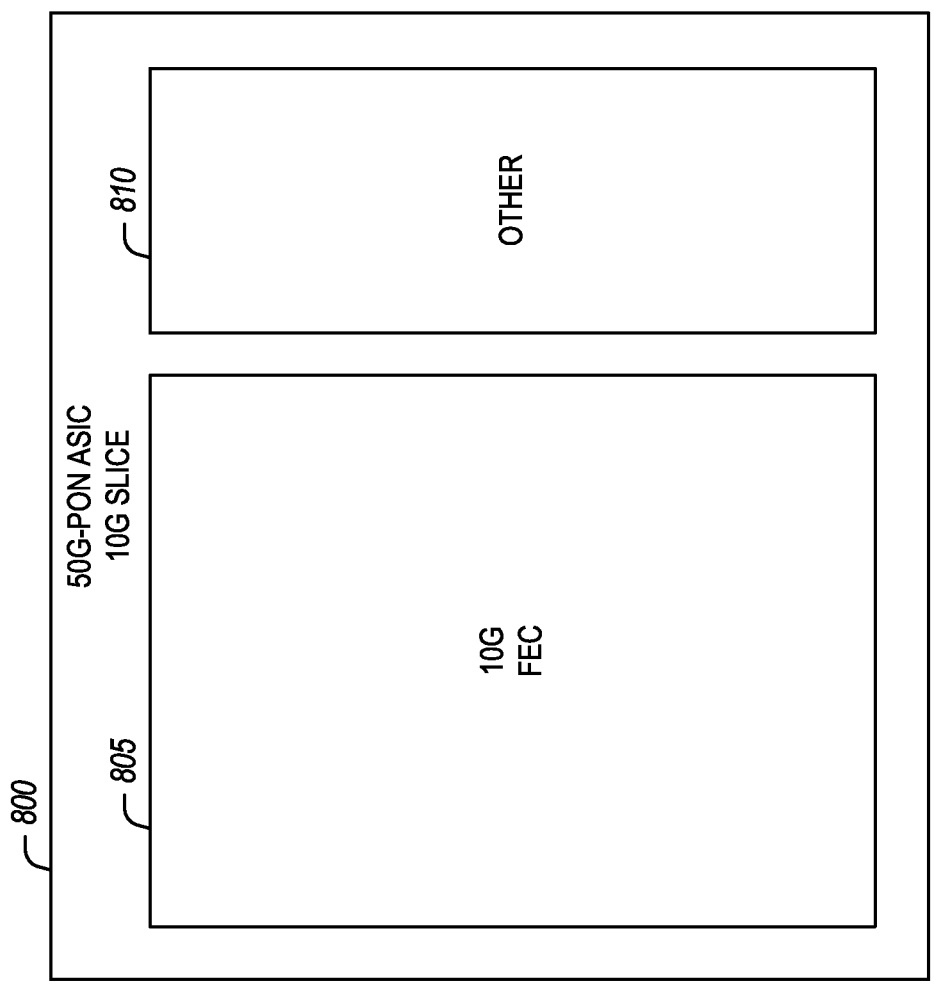
FIG. 8 illustrates an example of a size reduced media access control processor for forward error correction of a ten-gigabit slice of a fifty-gigabit passive optical network, according to an embodiment.

FIG. 8 illustrates an example of a size reduced media access control processor 800 for forward error correction of a ten-gigabit slice of a fifty-gigabit passive optical network, according to an embodiment. Even though the size reduced media access control processor 800 only supports a 10 G user network interface, the standard requires all 50 G of FEC to be processed. The systems and techniques discussed herein enable an ONU to reduce its FEC computational load and shown in TBL. 3.

TBL. 3

Sample Utilization Based on Iterations

1 Decoder Core = 27,000 LUTs
3 Iterations -> 4.1 Gbs per Decoder Core
12.5 G capacity = 3 Decoder Cores Total
Size = 27,000 * 12 = 81,000 LUTs This provides a design capacity for a new chip with a 12.5 G decoder engine 805 based according to a sample utilization shown in TBL. 4.

TBL. 4

| Lookup Tables (LUTs) | WORKLOAD |
| --- | --- |
| 81,000 | Downstream LDPC FEC Decoder (12.5 G, Three Iterations) |
| 30,000 | Downstream TC Layer Framing |
| 26,000 | Upstream Framing (w/ FEC Encoder) |
| 50,000 | Packet Processing |
| 16,000 | Misc |
| 203,000 | Total Utilization |

Not only is the chip design specification less than half the original size—the decoder engine 805 portion of the media access control processor 800 is reduced to 40% providing 60% for other processing workloads 810. From a silicon die perspective, this design yields more than two devices in the same area as one of the standard compliant devices. This directly translates to reductions in cost, media access control processor size, power consumption, etc.

Figure 9:
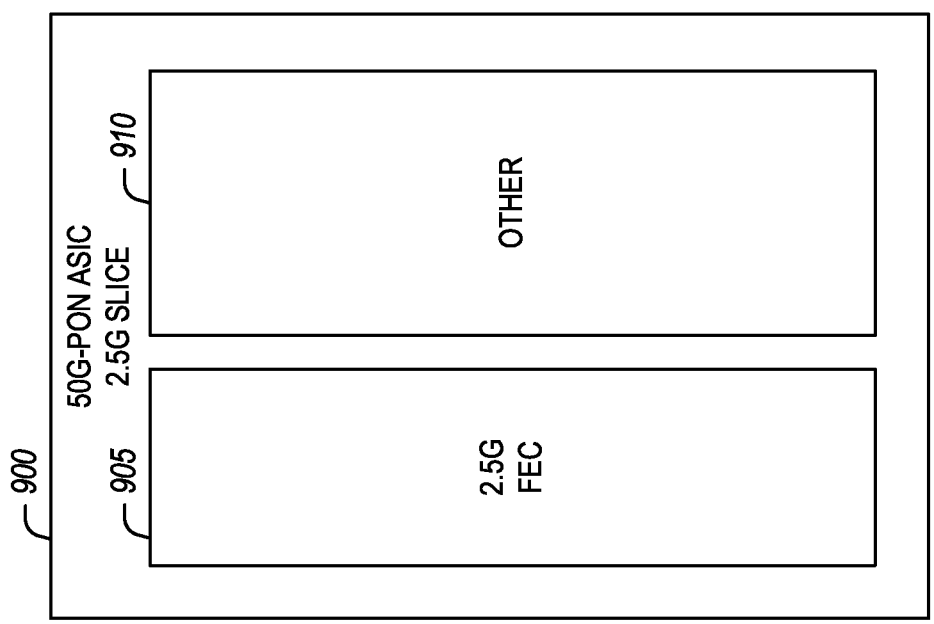
FIG. 9 illustrates an example of a size reduced media access control processor for forward error correction of a two and a half gigabit slice of a fifty-gigabit passive optical network, according to an embodiment.

FIG. 9 illustrates an example of a size reduced media access control processor 900 for forward error correction of a two and a half gigabit slice of a fifty-gigabit passive optical network, according to an embodiment. As the required throughput of a user network is reduced, the die size of a corresponding size reduced media access control processor 900 continues to reduce. For example, in a 50 G termination with a 2.5 G user network interface (UNI) for low-rate terminations such as power/utility monitors and other low-rate applications, a single decoder 905 core can be used that is approximately one-third the original size. This means that three of the size reduced media access control processors 900 can be produced for approximately the price of one standard compliant device based on a utilization as shown in FIG. 5.

TBL. 5

| Lookup Tables (LUTs) | WORKLOAD |
| --- | --- |
| 27,000 | Downstream LDPC FEC Decoder (2.5 G, Three Iterations) |
| 30,000 | Downstream TC Layer Framing |
| 26,000 | Upstream Framing (w/ FEC Encoder) |
| 50,000 | Packet Processing |
| 16,000 | Misc |
| 149,000 | Total Utilization |

The FEC decoder can dominate the design and reduced FEC processing enables design of smaller, more cost/power efficient devices because sizing is based upon the necessary user network interface (UNI) capacity, not the capacity of the wide-area network (WAN). For example, as illustrated in TBL. 5, the 2.5 single core decoder 905 has a utilization of approximately 18% allowing approximately 82% for other processing workloads 910. This becomes increasingly important as WAN speeds become much higher and support network slicing. Using the design size calculations, devices can be designed that terminate a slice, rather than devices that terminate the entire optical network reducing power consumption at increasing proportions as the decoding workload increases based on increasing network capacities. These design principles and the FEC processing reduction techniques discussed herein are applicable to any technology that is utilizing FEC. Thus, the energy savings and cost savings enabled by the systems and techniques discussed herein are applicable to a variety of network technologies and industries.

The number of cores, decoding utilization, and non-decoding utilization is used by a design application to calculate a geometry for the size reduced media access control processor 900. The geometry may include a number of decoding cores (e.g., decoder core 905, etc.) and other cores (e.g., cores for the other processing workloads 910, etc.) which in turn is used to select a die size and process technology for the size reduced media access control processor 900. The geometry is used to generate media access control processor specification data. The geometry of the die size is used to determine how many discrete dies can fit onto a standard sized multi-die silicon wafer during manufacturing. A smaller die size will yield more devices on a standard size silicon wafer. A smaller die size increases the yield of an individual die which are most often discarded during manufacturing test due to random probabilistic silicon wafer impurities. A smaller die size allows for flexibility in the silicon process technology selection such that an older, lower cost manufacturing process that doesn't require state-of-the-art density can be used. A smaller die size reduces the static power dissipation which is related to the number of biased transistors within a die. A smaller die size allows for flexibility in the package selection which is partially driven by power/thermal dissipation requirements due to static and dynamic power consumption. A smaller die size yields fewer wafers which results in decreased manufacturing time, decreased manufacturing material, decreased energy consumption, and decreased labor costs. The output media access control processor specification in input into a manufacturing process to program chip manufacturing equipment to manufacture media access control processors according to the media access control processor specification data.

Figure 10:
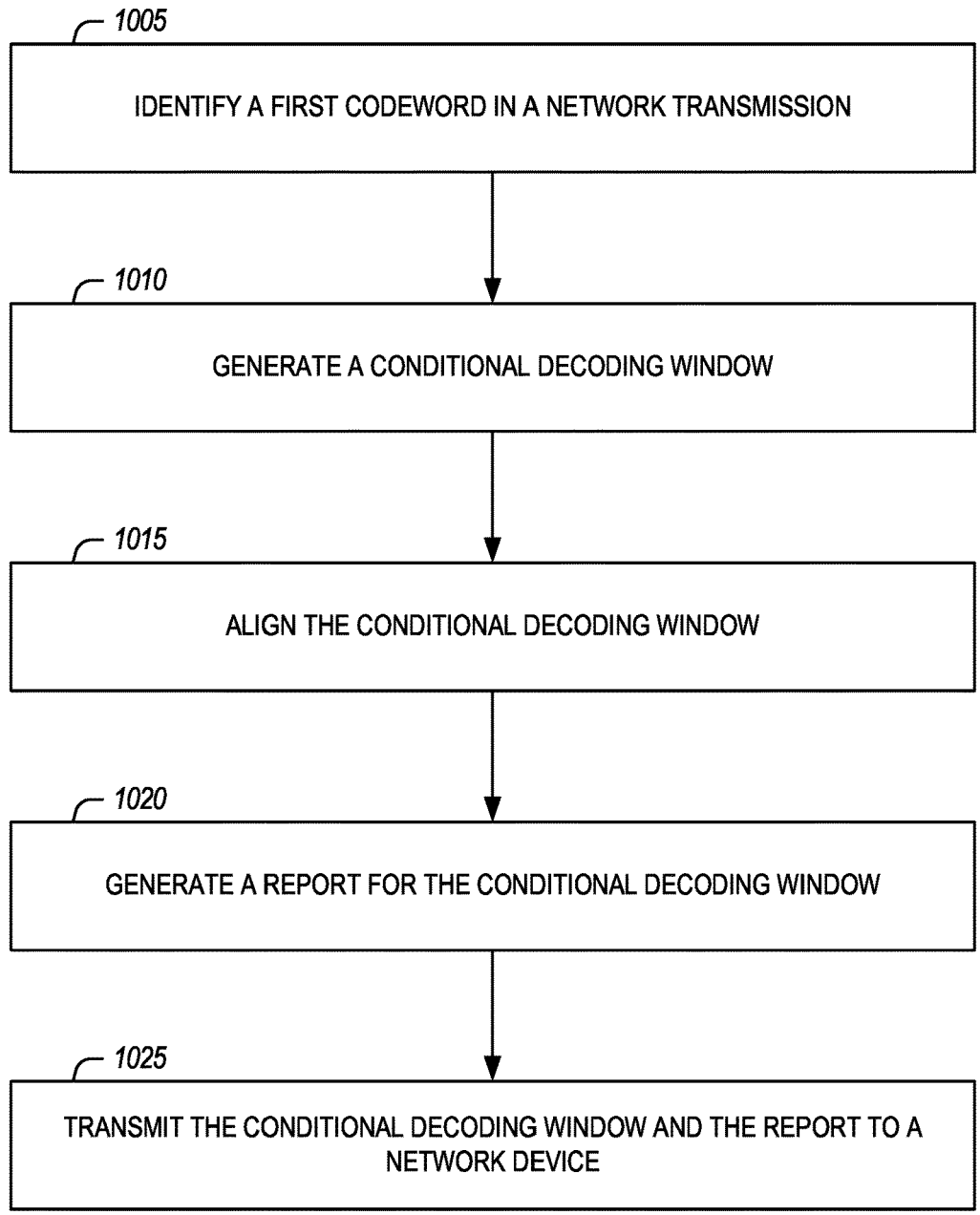
FIG. 10 illustrates an example of a method for generating conditional decoding windows for forward error correction decode processing power reduction, according to an embodiment.

FIG. 10 illustrates an example of a method 1000 for generating conditional decoding windows forward error correction decode processing power reduction, according to an embodiment. The method 1000 can provide features as described in FIGS. 1 to 9.

A first codeword is identified (e.g., by the codeword detector 225 as described in FIG. 2, etc.) in a network transmission (e.g., at operation 1005). In an example, the network transmission is a passive optical network transmission convergence (PON-TC).

A conditional decoding window is generated (e.g., by the CDW generator 230 as described in FIG. 2, etc.) that begins with the first codeword (e.g., at operation 1010). In an example, a codeword count can be determined for the conditional decoding window and additional codewords can be assigned to the conditional decoding window until the codeword count is reached. The additional codewords sequentially follow the first codeword in the network transmission. In an example, it can be determined that the additional codewords are insufficient to reach the codeword count and an idle frame can be added to the conditional decoding window to reach the codeword count.

The conditional decoding window is aligned (e.g., by the CDW aligner 235 as described in FIG. 2, etc.) with a frame of the network transmission (e.g., at operation 1015). In an example, the frame can be delineated to generate a delineation point and the conditional decoding window can be aligned with the delineation point.

A report is generated (e.g., by the report creator 240 as described in FIG. 2, etc.) that includes an indication of relevance of the conditional decoding window to a network device (e.g., at operation 1020). In an example, a binary indicator of the relevance of the conditional decoding window to the network device can be created for inclusion in the report. In an example, a list can be generated of codewords included in the conditional decoding window and a binary indicator of the relevance of each codeword in the list of codewords to the network device can be assigned for inclusion in the report.

In an example, it can be determined that network device is experiencing increased traffic volume and the list of codewords and the binary indicator of the relevance of each codeword can be included in the report before transmission to the network device.

The conditional decoding window and the report are transmitted (e.g., by the transceiver 255 as described in FIG. 2, etc.) to the network device (e.g., at operation 1025). In an example, a ten-gigabit capable encapsulation identifier (XGEM-ID) can be obtained and the report can be transmitted using the XGEM-ID. In an example, a physical layer operation administration and maintenance (PLOAM) message can be generated and the report can be transmitted within the PLOAM message. In an example, a link-layer Ethernet frame can be generated and the report can be transmitted within the link-layer Ethernet frame. In an example, a transmission convergence (TC) field can be generated and the report can be transmitted within the TC field.

In an example, a codeword count can be determined for the conditional decoding window and the codeword count can be transmitted to the network device.

Figure 11:
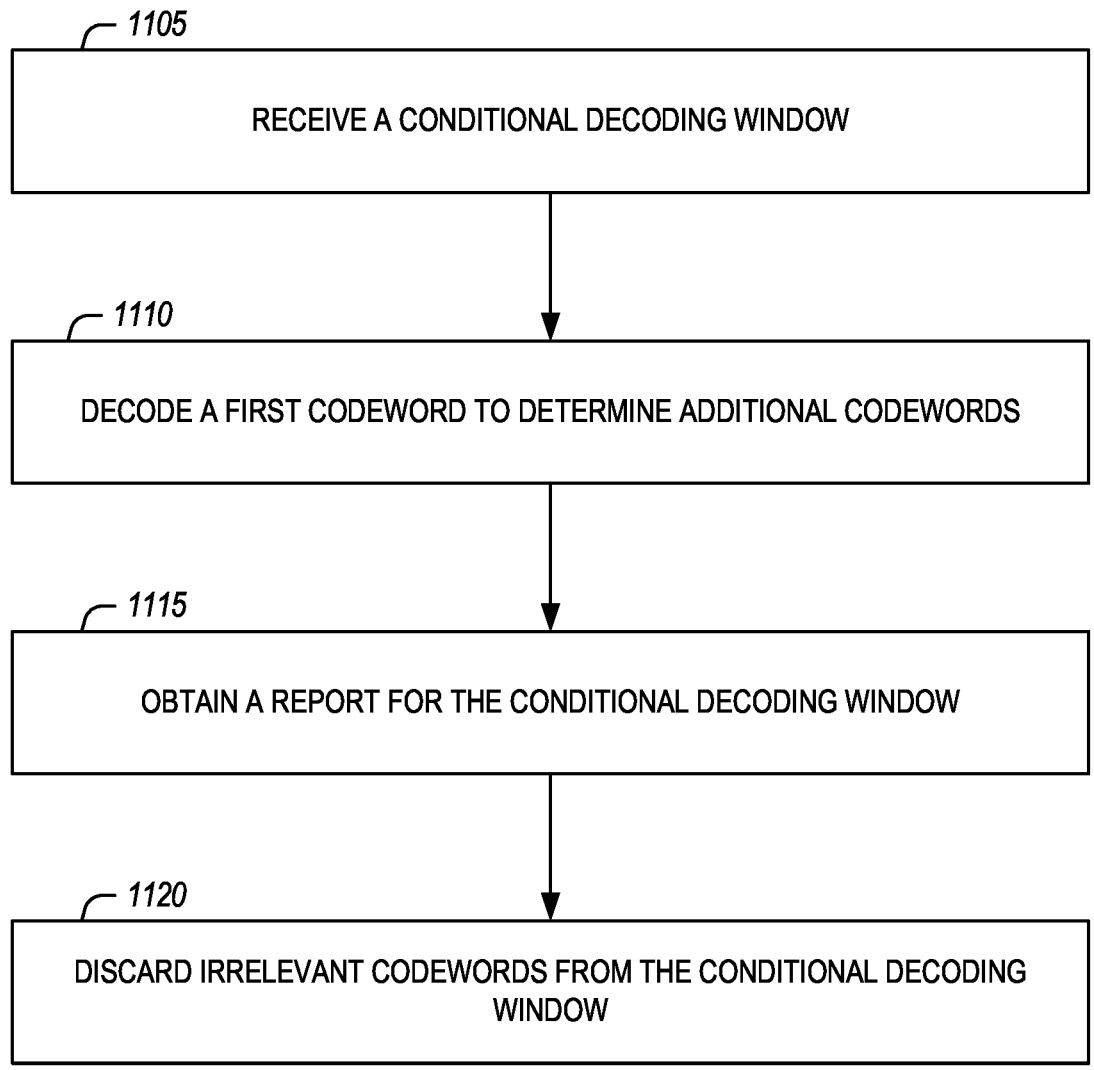
FIG. 11 illustrates an example of a method conditional decoding of codeword using a received conditional decoding window for forward error correction decode processing power reduction, according to an embodiment.

FIG. 11 illustrates an example of a method 1100 conditional decoding of codeword using a received conditional decoding window for forward error correction decode processing power reduction, according to an embodiment. The method 1100 can provide features as described in FIGS. 1 to 10.

A conditional decoding window is received (e.g., by the transceiver 255 as described in FIG. 2, etc.) including a first codeword (e.g., at operation 1105). The first codeword is decoded to determine a second codeword in the conditional decoding window (e.g., at operation 1110). A report is obtained (e.g., by the relevancy calculator 250 as described in FIG. 2, etc.) that includes a codeword relevance bit for the second codeword (e.g., at operation 1115). In an example, a physical layer operation administration and maintenance (PLOAM) message can be received and the report can be obtained from the PLOAM message. In an example, a link-layer Ethernet frame can be received and the report can be obtained from the link-layer Ethernet frame. In an example, a transmission convergence (TC) field can be identified in a network transmission and the report can be obtained from the TC field.

Upon a determination (e.g., by the relevancy calculator 250 as described in FIG. 2, etc.) that the codeword relevance bit indicates that the second codeword is irrelevant, the second codeword is discarded without decoding the second codeword (e.g., at operation 1120). In an example, a codeword count can be received for the conditional decoding window. It can be determined that a set of codewords including the second codeword contained in the conditional decoding window are irrelevant based on the codeword count and the codeword relevance bit and the conditional decoding window can be discarded without decoding the set of codewords.

In an example, a ten-gigabit capable encapsulation identifier (XGEM-ID) published on a network can be subscribed to. The report can be received based on the XGEM-ID. A map can be generated of a set of codewords in the conditional decoding window. It can be determined that a first subset of the set of codewords is relevant using the report and that a second subset of the set of codewords is irrelevant using the report. The first subset of the set of codewords can be decoded and the second subset of the set of codewords can be discarded without decoding.

Figure 12:
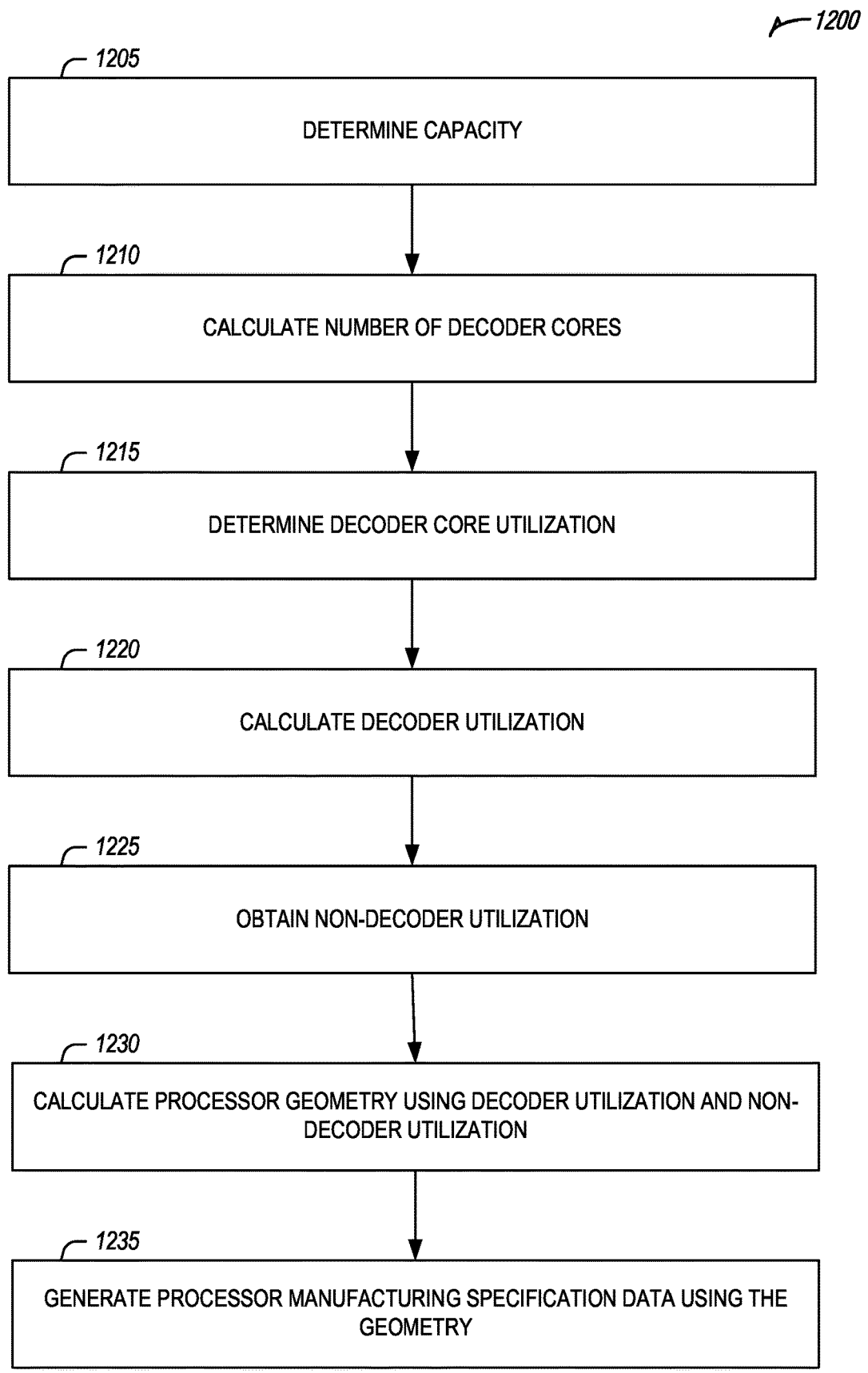
FIG. 12 illustrates an example of a method for sizing a media access control processor for forward error correction decode processing power reduction, according to an embodiment.

FIG. 12 illustrates an example of a method 1200 for sizing a media access control processor for forward error correction decode processing power reduction, according to an embodiment. The method 1200 may provide features as described in FIGS. 1 to 11.

A capacity of a network slice is determined for a user network interface (UNI) based on a subset of forward error correction (FEC) codewords to be decoded by the media access control processor (e.g., at operation 1205). In an example, the network slice may be a portion of a fifty gigabit passive optical network that is less than the full capacity of the fifty gigabit passive optical network. In an example, the media access control processor may be a field programmable gate array or an application specific integrated circuit.

A number of decoder cores is calculated to decode the capacity of the network slice (e.g., at operation 1210). A utilization value is determined for a decoder core (e.g., at operation 1215). In an example, the utilization value, decoder utilization value, and the non-decoding media access control processor utilization value may include a number of lookup tables (LUTs).

A decoder utilization value is calculated for the decoder cores using the utilization value a number of decoding iterations for the decoder cores (e.g., at operation 1220). A non-decoding media access control processor utilization value is obtained for the network slice (e.g., at operation 1225).

A geometry is calculated for the media access control processor using the number of decoder cores, the decoder utilization value, and the non-decoding media access control processor utilization value (e.g., at operation 1230). In an example, the geometry may include a die size determined based on the number of decoder cores and a number of non-decoding cores. A media access control processor manufacturing specification data is generated based on the calculated geometry (e.g., at operation 1235). In an example, the capacity of the network slice may be two and a half gigabits of a fifty gigabit network, wherein the number of decoder cores is one, and wherein the geometry includes one decoder core with a capacity of 27,000 lookup tables and one non-decoder core with a capacity of 122,000 lookup tables. In an example, the capacity of the network slice may be twelve and a half gigabits of a fifty gigabit network, wherein the number of decoder cores is twelve, and wherein the geometry includes twelve decoder cores, each decoder core with a capacity of 27,000 lookup tables, and one non-decoder core with a capacity of 122,000 lookup tables.

Figure 13:
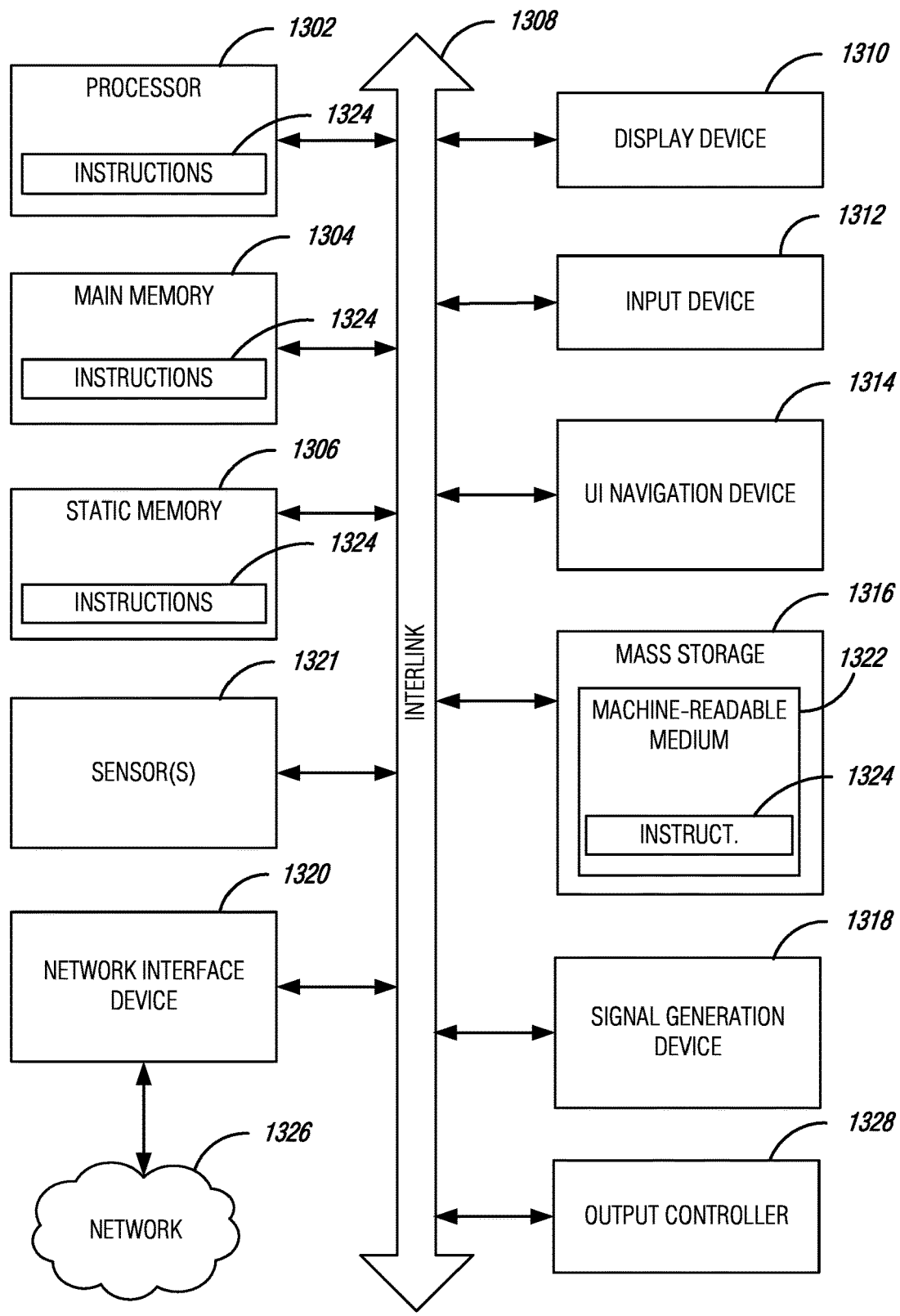
FIG. 13 is a block diagram illustrating an example of a machine upon which one or more embodiments can be implemented.

FIG. 13 illustrates a block diagram of an example machine 1300 upon which any one or more of the techniques (e.g., methodologies) discussed herein can perform. In alternative embodiments, the machine 1300 can operate as a standalone device or can be connected (e.g., networked) to other machines. In a networked deployment, the machine 1300 can operate in the capacity of a server machine, a client machine, or both in server-client network environments. In an example, the machine 1300 can act as a peer machine in peer-to-peer (P2P) (or other distributed) network environment. The machine 1300 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic or a number of components, or mechanisms. Circuit sets are a collection of circuits implemented in tangible entities that include hardware (e.g., simple circuits, gates, logic, etc.). Circuit set membership can be flexible over time and underlying hardware variability. Circuit sets include members that can, alone or in combination, perform specified operations when operating. In an example, hardware of the circuit set can be immutably designed to carry out a specific operation (e.g., hardwired). In an example, the hardware of the circuit set can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components can be used in more than one member of more than one circuit set. For example, under operation, execution units can be used in a first circuit of a first circuit set at one point in time and reused by a second circuit in the first circuit set, or by a third circuit in a second circuit set at a different time.

Machine (e.g., computer system) 1300 can include a hardware processor 1302 (e.g., a central processing unit (CPU), a graphics processing unit (GPU), a hardware processor core, or any combination thereof), a main memory 1304 and a static memory 1306, some or all of which can communicate with each other via an interlink (e.g., bus) 1308. The machine 1300 can further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 can be a touch screen display. The machine 1300 can additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensors. The machine 1300 can include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1316 can include a machine readable medium 1322 on which is stored one or more sets of data structures or instructions 1324 (e.g., software) embodying or utilized by any one or more of the techniques or functions described herein. The instructions 1324 can also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 can constitute machine readable media.

While the machine readable medium 1322 is illustrated as a single medium, the term "machine readable medium" can include a single medium or multiple media (e.g., a centralized or distributed database, and/or associated caches and servers) configured to store the one or more instructions 1324.

The term "machine readable medium" can include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples can include solid-state memories, and optical and magnetic media. In an example, machine readable media can exclude transitory propagating signals (e.g., non-transitory machine-readable storage media). Specific examples of non-transitory machine-readable storage media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 can further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 1320 can include one or more physical jacks (e.g., Ethernet, coaxial, or phone jacks) or one or more antennas to connect to the communications network 1326. In an example, the network interface device 1320 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software.

Additional Notes & Examples

Example 2 is a system for conditional forward error correction codeword decoding comprising: at least one processor; and memory including instructions that, when executed by the at least one processor, cause the at least one processor to perform operations to: identify a first codeword in a network transmission; generate a conditional decoding window that begins with the first codeword; align the conditional decoding window with a frame of the network transmission; generate a report that includes, an indication of relevance of the conditional decoding window to a network device; and transmit the conditional decoding window and the report to the network device.

In Example 3, the subject matter of Example 2 wherein, the network transmission is a passive optical network transmission convergence (PON-TC).

In Example 4, the subject matter of Examples 2-3 includes, the instructions to generate the conditional decoding window further comprising instructions that, when executed by the at least one processor, cause the at least one processor to perform operations to: determining a codeword count for the conditional decoding window; and assigning additional codewords to the conditional decoding window until the codeword count is reached, the additional codewords sequentially following the first codeword in the network transmission.

In Example 5, the subject matter of Example 4 includes, the memory further comprising instructions that, when executed by the at least one processor, cause the at least one processor to perform operations to: determine that the additional codewords are insufficient to reach the codeword count; and add an idle frame to the conditional decoding window to reach the codeword count.

In Example 6, the subject matter of Examples 2-5 includes, the instructions to align the conditional decoding window with the frame further comprising instructions that, when executed by the at least one processor, cause the at least one processor to perform operations to: delineate the frame to generate a delineation point, wherein the conditional decoding window is aligned with the delineation point.

In Example 7, the subject matter of Examples 2-6 includes, the instructions to generate the report that includes the indication of the relevance of the conditional decoding window to the network device further comprising instructions that, when executed by the at least one processor, cause the at least one processor to perform operations to: create a binary indicator of the relevance of the conditional decoding window to the network device for inclusion in the report.

In Example 8, the subject matter of Examples 2-7 includes, the instructions to generate the report that includes the indication of the relevance of the conditional decoding window to the network device further comprising instructions that, when executed by the at least one processor, cause the at least one processor to perform operations to: generate a list of codewords included in the conditional decoding window; and assign a binary indicator of the relevance of each codeword in the list of codewords to the network device for inclusion in the report.

In Example 9, the subject matter of Example 8 includes, the memory further comprising instructions that, when executed by the at least one processor, cause the at least one processor to perform operations to: determine that network device is experiencing increased traffic volume; and include the list of codewords and the binary indicator of the relevance of each codeword in the report before transmission to the network device.

In Example 10, the subject matter of Examples 2-9 includes, the memory further comprising instructions that, when executed by the at least one processor, cause the at least one processor to perform operations to: obtain a ten-gigabit capable encapsulation identifier (XGEM-ID), wherein the report is transmitted using the XGEM-ID.

In Example 11, the subject matter of Examples 2-10 includes, the memory further comprising instructions that, when executed by the at least one processor, cause the at least one processor to perform operations to: generate a physical layer operation administration and maintenance (PLOAM) message, wherein the report is transmitted within the PLOAM message.

In Example 12, the subject matter of Examples 2-11 includes, the memory further comprising instructions that, when executed by the at least one processor, cause the at least one processor to perform operations to: generate a link-layer ethernet frame, wherein the report is transmitted within the link-layer ethernet frame.

In Example 13, the subject matter of Examples 2-12 includes, the memory further comprising instructions that, when executed by the at least one processor, cause the at least one processor to perform operations to: generate a transmission convergence (TC) field, where the report is transmitted within the TC field.

In Example 14, the subject matter of Examples 2-13 includes, the memory further comprising instructions that, when executed by the at least one processor, cause the at least one processor to perform operations to: determine a codeword count for the conditional decoding window; and transmit the codeword count to the network device.

Example 15 is at least one non-transitory machine-readable medium including instructions for conditional forward error correction codeword decoding that, when executed by at least one processor, cause the at least one processor to perform operations to: identify a first codeword in a network transmission; generate a conditional decoding window that begins with the first codeword; align the conditional decoding window with a frame of the network transmission; generate a report that includes, an indication of relevance of the conditional decoding window to a network device; and transmit the conditional decoding window and the report to the network device.

In Example 16, the subject matter of Example 15 wherein, the network transmission is a passive optical network transmission convergence (PON-TC).

In Example 17, the subject matter of Examples 15-16 includes, the instructions to generate the conditional decoding window further comprising instructions that, when executed by the at least one processor, cause the at least one processor to perform operations to: determining a codeword count for the conditional decoding window; and assigning additional codewords to the conditional decoding window until the codeword count is reached, the additional codewords sequentially following the first codeword in the network transmission.

In Example 18, the subject matter of Example 17 includes, instructions that, when executed by the at least one processor, cause the at least one processor to perform operations to: determine that the additional codewords are insufficient to reach the codeword count; and add an idle frame to the conditional decoding window to reach the codeword count.

In Example 19, the subject matter of Examples 15-18 includes, the instructions to align the conditional decoding window with the frame further comprising instructions that, when executed by the at least one processor, cause the at least one processor to perform operations to: delineate the frame to generate a delineation point, wherein the conditional decoding window is aligned with the delineation point.

In Example 20, the subject matter of Examples 15-19 includes, the instructions to generate the report that includes the indication of the relevance of the conditional decoding window to the network device further comprising instructions that, when executed by the at least one processor, cause the at least one processor to perform operations to: create a binary indicator of the relevance of the conditional decoding window to the network device for inclusion in the report.

In Example 21, the subject matter of Examples 15-20 includes, the instructions to generate the report that includes the indication of the relevance of the conditional decoding window to the network device further comprising instructions that, when executed by the at least one processor, cause the at least one processor to perform operations to: generate a list of codewords included in the conditional decoding window; and assign a binary indicator of the relevance of each codeword in the list of codewords to the network device for inclusion in the report.

In Example 22, the subject matter of Example 21 includes, instructions that, when executed by the at least one processor, cause the at least one processor to perform operations to: determine that network device is experiencing increased traffic volume; and include the list of codewords and the binary indicator of the relevance of each codeword in the report before transmission to the network device.

In Example 23, the subject matter of Examples 15-22 includes, instructions that, when executed by the at least one processor, cause the at least one processor to perform operations to: obtain a ten-gigabit capable encapsulation identifier (XGEM-ID), wherein the report is transmitted using the XGEM-ID.

In Example 24, the subject matter of Examples 15-23 includes, instructions that, when executed by the at least one processor, cause the at least one processor to perform operations to: generate a physical layer operation administration and maintenance (PLOAM) message, wherein the report is transmitted within the PLOAM message.

In Example 25, the subject matter of Examples 15-24 includes, instructions that, when executed by the at least one processor, cause the at least one processor to perform operations to: generate a link-layer ethernet frame, wherein the report is transmitted within the link-layer ethernet frame.

In Example 26, the subject matter of Examples 15-25 includes, instructions that, when executed by the at least one processor, cause the at least one processor to perform operations to: generate a transmission convergence (TC) field, where the report is transmitted within the TC field.

In Example 27, the subject matter of Examples 15-26 includes, instructions that, when executed by the at least one processor, cause the at least one processor to perform operations to: determine a codeword count for the conditional decoding window; and transmit the codeword count to the network device.

Example 28 is a method for conditional forward error correction codeword decoding comprising: identifying a first codeword in a network transmission; generating a conditional decoding window that begins with the first codeword; aligning the conditional decoding window with a frame of the network transmission; generating a report that includes, an indication of relevance of the conditional decoding window to a network device; and transmitting the conditional decoding window and the report to the network device.

In Example 29, the subject matter of Example 28 wherein, the network transmission is a passive optical network transmission convergence (PON-TC).

In Example 30, the subject matter of Examples 28-29 wherein, generating the conditional decoding window further comprises: determining a codeword count for the conditional decoding window; and assigning additional codewords to the conditional decoding window until the codeword count is reached, the additional codewords sequentially following the first codeword in the network transmission.

In Example 31, the subject matter of Example 30 includes, determining that the additional codewords are insufficient to reach the codeword count; and adding an idle frame to the conditional decoding window to reach the codeword count.

In Example 32, the subject matter of Examples 28-31 wherein, aligning the conditional decoding window with the frame further comprises: delineating the frame to generate a delineation point, wherein the conditional decoding window is aligned with the delineation point.

In Example 33, the subject matter of Examples 28-32 wherein, generating the report that includes the indication of the relevance of the conditional decoding window to the network device further comprises: creating a binary indicator of the relevance of the conditional decoding window to the network device for inclusion in the report.

In Example 34, the subject matter of Examples 28-33 wherein, generating the report that includes the indication of the relevance of the conditional decoding window to the network device further comprises: generating a list of codewords included in the conditional decoding window; and assigning a binary indicator of the relevance of each codeword in the list of codewords to the network device for inclusion in the report.

In Example 35, the subject matter of Example 34 includes, determining that network device is experiencing increased traffic volume; and including the list of codewords and the binary indicator of the relevance of each codeword in the report before transmission to the network device.

In Example 36, the subject matter of Examples 28-35 includes, obtaining a ten-gigabit capable encapsulation identifier (XGEM-ID), wherein the report is transmitted using the XGEM-ID.

In Example 37, the subject matter of Examples 28-36 includes, generating a physical layer operation administration and maintenance (PLOAM) message, wherein the report is transmitted within the PLOAM message.

In Example 38, the subject matter of Examples 28-37 includes, generating a link-layer ethernet frame, wherein the report is transmitted within the link-layer ethernet frame.

In Example 39, the subject matter of Examples 28-38 includes, generating a transmission convergence (TC) field, where the report is transmitted within the TC field.

In Example 40, the subject matter of Examples 28-39 includes, determining a codeword count for the conditional decoding window; and transmitting the codeword count to the network device.

Example 41 is a system for conditional forward error correction codeword decoding comprising: at least one processor; and memory including instructions that, when executed by the at least one processor, cause the at least one processor to perform operations to: receive a conditional decoding window including a first codeword; decode the first codeword to determine a second codeword in the conditional decoding window; obtain a report that includes, a codeword relevance bit for the second codeword; and upon a determination that the codeword relevance bit indicates that the second codeword is irrelevant, discard the second codeword without decoding the second codeword.

In Example 42, the subject matter of Example 41 includes, the memory further comprising instructions that, when executed by at least one processor, cause the at least one processor to perform operations to: receive a codeword count for the conditional decoding window; determine that a set of codewords including the second codeword contained in the conditional decoding window are irrelevant based on the codeword count and the codeword relevance bit; and discard the conditional decoding window without decoding the set of codewords.

In Example 43, the subject matter of Examples 41-42 includes, the memory further comprising instructions that, when executed by at least one processor, cause the at least one processor to perform operations to: subscribe to a ten-gigabit capable encapsulation identifier (XGEM-ID) published on a network; receive the report based on the XGEM-ID; generate a map of a set of codewords in the conditional decoding window; determine that a first subset of the set of codewords is relevant using the report; determine that a second subset of the set of codewords is irrelevant using the report; decode the first subset of the set of codewords; and discard the second subset of the set of codewords without decoding.

In Example 44, the subject matter of Examples 41-43 includes, the memory further comprising instructions that, when executed by at least one processor, cause the at least one processor to perform operations to: receive a physical layer operation administration and maintenance (PLOAM) message; and obtain the report from the PLOAM message.

In Example 45, the subject matter of Examples 41-44 includes, the memory further comprising instructions that, when executed by at least one processor, cause the at least one processor to perform operations to: receive a link-layer ethernet frame; and obtain the report from the link-layer ethernet frame.

In Example 46, the subject matter of Examples 41-45 includes, the memory further comprising instructions that, when executed by at least one processor, cause the at least one processor to perform operations to: identify a transmission convergence (TC) field in a network transmission; and obtain the report from the TC field.

Example 47 is at least one non-transitory machine-readable medium including instructions for conditional forward error correction codeword decoding that, when executed by at least one processor, cause the at least one processor to perform operations to: receive a conditional decoding window including a first codeword; decode the first codeword to determine a second codeword in the conditional decoding window; obtain a report that includes, a codeword relevance bit for the second codeword; and upon a determination that the codeword relevance bit indicates that the second codeword is irrelevant, discard the second codeword without decoding the second codeword.

In Example 48, the subject matter of Example 47 includes, instructions that, when executed by at least one processor, cause the at least one processor to perform operations to: receive a codeword count for the conditional decoding window; determine that a set of codewords including the second codeword contained in the conditional decoding window are irrelevant based on the codeword count and the codeword relevance bit; and discard the conditional decoding window without decoding the set of codewords.

In Example 49, the subject matter of Examples 47-48 includes, instructions that, when executed by at least one processor, cause the at least one processor to perform operations to: subscribe to a ten-gigabit capable encapsulation identifier (XGEM-ID) published on a network; receive the report based on the XGEM-ID; generate a map of a set of codewords in the conditional decoding window; determine that a first subset of the set of codewords is relevant using the report; determine that a second subset of the set of codewords is irrelevant using the report; decode the first subset of the set of codewords; and discard the second subset of the set of codewords without decoding.

In Example 50, the subject matter of Examples 47-49 includes, instructions that, when executed by at least one processor, cause the at least one processor to perform operations to: receive a physical layer operation administration and maintenance (PLOAM) message; and obtain the report from the PLOAM message.

In Example 51, the subject matter of Examples 47-50 includes, instructions that, when executed by at least one processor, cause the at least one processor to perform operations to: receive a link-layer ethernet frame; and obtain the report from the link-layer ethernet frame.

In Example 52, the subject matter of Examples 47-51 includes, instructions that, when executed by at least one processor, cause the at least one processor to perform operations to: identify a transmission convergence (TC) field in a network transmission; and obtain the report from the TC field.

Example 53 is a method for conditional forward error correction codeword decoding comprising: receiving a conditional decoding window including a first codeword; decoding the first codeword to determine a second codeword in the conditional decoding window; obtaining a report that includes, a codeword relevance bit for the second codeword; and upon determining that the codeword relevance bit indicates that the second codeword is irrelevant, discard the second codeword without decoding the second codeword.

In Example 54, the subject matter of Example 53 includes, receiving a codeword count for the conditional decoding window; determining that a set of codewords including the second codeword contained in the conditional decoding window are irrelevant based on the codeword count and the codeword relevance bit; and discarding the conditional decoding window without decoding the set of codewords.

In Example 55, the subject matter of Examples 53-54 includes, subscribing to a ten-gigabit capable encapsulation identifier (XGEM-ID) published on a network; receiving the report based on the XGEM-ID; generating a map of a set of codewords in the conditional decoding window; determining that a first subset of the set of codewords is relevant using the report; determining that a second subset of the set of codewords is irrelevant using the report; decoding the first subset of the set of codewords; and discarding the second subset of the set of codewords without decoding.

In Example 56, the subject matter of Examples 53-55 includes, receiving a physical layer operation administration and maintenance (PLOAM) message; and obtaining the report from the PLOAM message.

In Example 57, the subject matter of Examples 53-56 includes, receiving a link-layer ethernet frame; and obtaining the report from the link-layer ethernet frame.

In Example 58, the subject matter of Examples 53-57 includes, identifying a transmission convergence (TC) field in a network transmission; and obtaining the report from the TC field.

Example 59 is a system for generating media access control processor manufacturing specification data comprising: at least one processor; and memory comprising instructions that, when executed by the at least one processor, cause the at least one processor to perform operations to: determine a capacity of a network slice for a user network interface (UNI) based on a subset of forward error correction (FEC) codewords to be decoded by the media access control processor; calculate a number of decoder cores to decode the capacity of the network slice; determine a utilization value for a decoder core; calculate a decoder utilization value for the decoder cores using the utilization value a number of decoding iterations for the decoder cores; obtain a non-decoding media access control processor utilization value for the network slice; calculate a geometry for the media access control processor using the number of decoder cores, the decoder utilization value, and the non-decoding media access control processor utilization value; and generate the media access control processor manufacturing specification data based on the calculated geometry.

In Example 60, the subject matter of Example 59 wherein, the utilization value, decoder utilization value, and the non-decoding media access control processor utilization value include a number or lookup tables (LUTs).

In Example 61, the subject matter of Examples 59-60 wherein, the network slice is a portion of a fifty gigabit passive optical network that is less than the full capacity of the fifty gigabit passive optical network.

In Example 62, the subject matter of Examples 59-61 wherein, the capacity of the network slice is two and a half gigabits of a fifty gigabit network, wherein the number of decoder cores is one, and wherein the geometry includes one decoder core with a capacity of 27,000 lookup tables and one non-decoder core with a capacity of 122,000 lookup tables.

In Example 63, the subject matter of Examples 59-62 wherein, the capacity of the network slice is twelve and a half gigabits of a fifty gigabit network, wherein the number of decoder cores is twelve, and wherein the geometry includes twelve decoder cores, each decoder core with a capacity of 27,000 lookup tables, and one non-decoder core with a capacity of 122,000 lookup tables.

In Example 64, the subject matter of Examples 59-63 wherein, the geometry includes a die size determined based on the number of decoder cores and a number of non-decoding cores.

In Example 65, the subject matter of Examples 59-64 wherein, the media access control processor is a field programmable gate array or an application specific integrated circuit.

Example 66 is at least one non-transitory machine-readable medium comprising instructions for generating media access control processor manufacturing specification data comprising that, when executed by at least one processor, cause the at least one processor to perform operations to: determine a capacity of a network slice for a user network interface (UNI) based on a subset of forward error correction (FEC) codewords to be decoded by the media access control processor; calculate a number of decoder cores to decode the capacity of the network slice; determine a utilization value for a decoder core; calculate a decoder utilization value for the decoder cores using the utilization value a number of decoding iterations for the decoder cores; obtain a non-decoding media access control processor utilization value for the network slice; calculate a geometry for the media access control processor using the number of decoder cores, the decoder utilization value, and the non-decoding media access control processor utilization value; and generate the media access control processor manufacturing specification data based on the calculated geometry.

In Example 67, the subject matter of Example 66 wherein, the utilization value, decoder utilization value, and the non-decoding media access control processor utilization value include a number or lookup tables (LUTs).

In Example 68, the subject matter of Examples 66-67 wherein, the network slice is a portion of a fifty gigabit passive optical network that is less than the full capacity of the fifty gigabit passive optical network.

In Example 69, the subject matter of Examples 66-68 wherein, the capacity of the network slice is two and a half gigabits of a fifty gigabit network, wherein the number of decoder cores is one, and wherein the geometry includes one decoder core with a capacity of 27,000 lookup tables and one non-decoder core with a capacity of 122,000 lookup tables.

In Example 70, the subject matter of Examples 66-69 wherein, the capacity of the network slice is twelve and a half gigabits of a fifty gigabit network, wherein the number of decoder cores is twelve, and wherein the geometry includes twelve decoder cores, each decoder core with a capacity of 27,000 lookup tables, and one non-decoder core with a capacity of 122,000 lookup tables.

In Example 71, the subject matter of Examples 66-70 wherein, the geometry includes a die size determined based on the number of decoder cores and a number of non-decoding cores.

In Example 72, the subject matter of Examples 66-71 wherein, the media access control processor is a field programmable gate array or an application specific integrated circuit.

Example 73 is a method for generating media access control processor manufacturing specification data comprising: determining a capacity of a network slice for a user network interface (UNI) based on a subset of forward error correction (FEC) codewords to be decoded by the media access control processor; calculating a number of decoder cores to decode the capacity of the network slice; determining a utilization value for a decoder core; calculating a decoder utilization value for the decoder cores using the utilization value a number of decoding iterations for the decoder cores; obtaining a non-decoding media access control processor utilization value for the network slice; calculating a geometry for the media access control processor using the number of decoder cores, the decoder utilization value, and the non-decoding media access control processor utilization value; and generating the media access control processor manufacturing specification data based on the calculated geometry.

In Example 74, the subject matter of Example 73 wherein, the utilization value, decoder utilization value, and the non-decoding media access control processor utilization value include a number or lookup tables (LUTs).

In Example 75, the subject matter of Examples 73-74 wherein, the network slice is a portion of a fifty gigabit passive optical network that is less than the full capacity of the fifty gigabit passive optical network.

In Example 76, the subject matter of Examples 73-75 wherein, the capacity of the network slice is two and a half gigabits of a fifty gigabit network, wherein the number of decoder cores is one, and wherein the geometry includes one decoder core with a capacity of 27,000 lookup tables and one non-decoder core with a capacity of 122,000 lookup tables.

In Example 77, the subject matter of Examples 73-76 wherein, the capacity of the network slice is twelve and a half gigabits of a fifty gigabit network, wherein the number of decoder cores is twelve, and wherein the geometry includes twelve decoder cores, each decoder core with a capacity of 27,000 lookup tables, and one non-decoder core with a capacity of 122,000 lookup tables.

In Example 78, the subject matter of Examples 73-77 wherein, the geometry includes a die size determined based on the number of decoder cores and a number of non-decoding cores.

In Example 79, the subject matter of Examples 73-78 wherein, the media access control processor is a field programmable gate array or an application specific integrated circuit.

Example 80 is at least one machine-readable medium including instructions that, when executed by processing circuitry, cause the processing circuitry to perform operations to implement of any of Examples 2-79.

Example 81 is an apparatus comprising means to implement of any of Examples 2-79.

Example 82 is a system to implement of any of Examples 2-79.

Example 83 is a method to implement of any of Examples 2-79.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. At least one non-transitory machine-readable medium comprising instructions for generating media access control processor manufacturing specification data comprising that, when executed by at least one processor, cause the at least one processor to perform operations to:
    determine a capacity of a network slice for a user network interface (UNI) based on a subset of forward error correction (FEC) codewords to be decoded by the media access control processor;
    calculate a number of decoder cores to decode the capacity of the network slice;
    determine a utilization value for a decoder core;
    calculate a decoder utilization value for the decoder cores using the utilization value a number of decoding iterations for the decoder cores;
    obtain a non-decoding media access control processor utilization value for the network slice;
    calculate a geometry for the media access control processor using the number of decoder cores, the decoder utilization value, and the non-decoding media access control processor utilization value; and
    generate the media access control processor manufacturing specification data based on the calculated geometry.

2. The at least one non-transitory machine-readable medium of claim 1, wherein the utilization value, decoder utilization value, and the non-decoding media access control processor utilization value include a number of lookup tables (LUTs).

3. The at least one non-transitory machine-readable medium of claim 1, wherein the network slice is a portion of a fifty gigabit passive optical network that is less than the full capacity of the fifty gigabit passive optical network.

4. The at least one non-transitory machine-readable medium of claim 1, wherein the capacity of the network slice is two and a half gigabits of a fifty gigabit network, wherein the number of decoder cores is one, and wherein the geometry includes one decoder core with a capacity of 27,000 lookup tables and one non-decoder core with a capacity of 122,000 lookup tables.

5. The at least one non-transitory machine-readable medium of claim 1, wherein the capacity of the network slice is twelve and a half gigabits of a fifty gigabit network, wherein the number of decoder cores is twelve, and wherein the geometry includes twelve decoder cores, each decoder core with a capacity of 27,000 lookup tables, and one non-decoder core with a capacity of 122,000 lookup tables.

6. The at least one non-transitory machine-readable medium of claim 1, wherein the geometry includes a die size determined based on the number of decoder cores and a number of non-decoding cores.

7. The at least one non-transitory machine-readable medium of claim 1, wherein the media access control processor is a field programmable gate array or an application specific integrated circuit.

8. A system for generating media access control processor manufacturing specification data comprising:
    at least one processor; and
    memory comprising instructions that, when executed by the at least one processor, cause the at least one processor to perform operations to:
        determine a capacity of a network slice for a user network interface (UNI) based on a subset of forward error correction (FEC) codewords to be decoded by the media access control processor;
        calculate a number of decoder cores to decode the capacity of the network slice;
        determine a utilization value for a decoder core;
        calculate a decoder utilization value for the decoder cores using the utilization value a number of decoding iterations for the decoder cores;
        obtain a non-decoding media access control processor utilization value for the network slice;
        calculate a geometry for the media access control processor using the number of decoder cores, the decoder utilization value, and the non-decoding media access control processor utilization value; and
        generate the media access control processor manufacturing specification data based on the calculated geometry.

9. The system of claim 8, wherein the utilization value, decoder utilization value, and the non-decoding media access control processor utilization value include a number of lookup tables (LUTs).

10. The system of claim 8, wherein the network slice is a portion of a fifty gigabit passive optical network that is less than the full capacity of the fifty gigabit passive optical network.

11. The system of claim 8, wherein the capacity of the network slice is two and a half gigabits of a fifty gigabit network, wherein the number of decoder cores is one, and wherein the geometry includes one decoder core with a capacity of 27,000 lookup tables and one non-decoder core with a capacity of 122,000 lookup tables.

12. The system of claim 8, wherein the capacity of the network slice is twelve and a half gigabits of a fifty gigabit network, wherein the number of decoder cores is twelve, and wherein the geometry includes twelve decoder cores, each decoder core with a capacity of 27,000 lookup tables, and one non-decoder core with a capacity of 122,000 lookup tables.

13. The system of claim 8, wherein the geometry includes a die size determined based on the number of decoder cores and a number of non-decoding cores.

14. A method for generating media access control processor manufacturing specification data comprising:
- determining a capacity of a network slice for a user network interface (UNI) based on a subset of forward error correction (FEC) codewords to be decoded by the media access control processor;
- calculating a number of decoder cores to decode the capacity of the network slice;
- determining a utilization value for a decoder core;
- calculating a decoder utilization value for the decoder cores using the utilization value a number of decoding iterations for the decoder cores;
- obtaining a non-decoding media access control processor utilization value for the network slice;
- calculating a geometry for the media access control processor using the number of decoder cores, the decoder utilization value, and the non-decoding media access control processor utilization value; and
- generating the media access control processor manufacturing specification data based on the calculated geometry.

15. The method of claim 14, wherein the utilization value, decoder utilization value, and the non-decoding media access control processor utilization value include a number of lookup tables (LUTs).

16. The method of claim 14, wherein the network slice is a portion of a fifty gigabit passive optical network that is less than the full capacity of the fifty gigabit passive optical network.

17. The method of claim 14, wherein the capacity of the network slice is two and a half gigabits of a fifty gigabit network, wherein the number of decoder cores is one, and wherein the geometry includes one decoder core with a capacity of 27,000 lookup tables and one non-decoder core with a capacity of 122,000 lookup tables.

18. The method of claim 14, wherein the capacity of the network slice is twelve and a half gigabits of a fifty gigabit network, wherein the number of decoder cores is twelve, and wherein the geometry includes twelve decoder cores, each decoder core with a capacity of 27,000 lookup tables, and one non-decoder core with a capacity of 122,000 lookup tables.

19. The method of claim 14, wherein the geometry includes a die size determined based on the number of decoder cores and a number of non-decoding cores.

20. The method of claim 14, wherein the media access control processor is a field programmable gate array or an application specific integrated circuit.

* * * * *